United States Patent
Wu et al.

(10) Patent No.: US 11,184,059 B2
(45) Date of Patent: Nov. 23, 2021

(54) DATA TRANSMISSION METHOD, APPARATUS, AND SYSTEM

(71) Applicant: HUAWEI TECHNOLOGIES CO., LTD., Guangdong (CN)

(72) Inventors: Ye Wu, Shanghai (CN); Huangping Jin, Shanghai (CN); Wei Han, Shanghai (CN); Xiaoyan Bi, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/746,850

(22) Filed: Jan. 18, 2020

(65) Prior Publication Data

US 2020/0153488 A1 May 14, 2020

Related U.S. Application Data

(63) Continuation of application No. PCT/CN2018/091929, filed on Jun. 20, 2018.

(30) Foreign Application Priority Data

Jul. 25, 2017 (CN) .......................... 201710611830.1

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0417* (2013.01); *H04B 7/10* (2013.01)

(58) Field of Classification Search
CPC .. H04B 7/0456; H04B 7/0417; H04B 7/0689; H04B 7/10
See application file for complete search history.

(56) References Cited

U.S. PATENT DOCUMENTS 9,654,264 B2* 5/2017 Athley ................. H04B 7/0684
10,498,513 B2* 12/2019 Marinier ............... H04L 5/0051
(Continued)

FOREIGN PATENT DOCUMENTS

| CN | 102833053 A | 12/2012 |
|----|-------------|---------|
| CN | 104218982 A | 12/2014 |

(Continued)

*Primary Examiner* — Dac V Ha
(74) *Attorney, Agent, or Firm* — Womble Bond Dickinson (US) LLP

(57) ABSTRACT

This application provides a data transmission method and apparatus, and a system. The method includes: receiving, by a terminal device, a first group of precoded reference signals and a second group of precoded reference signals, where the first group of precoded reference signals includes at least one precoded reference signal, and the second group of precoded reference signals includes at least one precoded reference signal; and feeding back, by the terminal device, at least one piece of first indication information based on a transmission scheme that channel state information CSI feedback is based on, where the at least one piece of first indication information is used to determine a plurality of precoding vectors, at least one of the plurality of precoding vectors is a precoding vector corresponding to the at least one precoded reference signal in the first group of precoded reference signals, and at least one of the plurality of precoding vectors is a precoding vector corresponding to the at least one precoded reference signal in the second group of precoded reference signals.

17 Claims, 7 Drawing Sheets

(51) Int. Cl.
*H04B 7/0417* (2017.01)
*H04B 7/10* (2017.01)

(56) References Cited

U.S. PATENT DOCUMENTS

| | | | |
|---|---|---|---|
| 2013/0308715 A1 | 11/2013 | Nam et al. | |
| 2015/0124688 A1 | 5/2015 | Xu et al. | |
| 2017/0181132 A1* | 6/2017 | Xiao | H04L 5/0023 |
| 2017/0244533 A1* | 8/2017 | Onggosanusi | H04L 5/0048 |
| 2018/0205437 A1* | 7/2018 | Kim | H04B 7/0456 |
| 2019/0386720 A1* | 12/2019 | Qian | H04B 7/0456 |
| 2020/0186208 A1* | 6/2020 | Moles Cases | H04B 7/0456 |

FOREIGN PATENT DOCUMENTS

| | | |
|---|---|---|
| CN | 104396153 A | 3/2015 |
| CN | 106160925 A | 11/2016 |
| CN | 106685582 A | 5/2017 |
| EP | 3331172 A1 | 6/2018 |
| WO | 2014182002 A1 | 11/2014 |
| WO | 2017020749 A1 | 2/2017 |

* cited by examiner

DATA TRANSMISSION METHOD, APPARATUS, AND SYSTEM

CROSS-REFERENCE TO RELATED APPLICATIONS

This application is a continuation of International Application No. PCT/CN2018/091929, filed on Jun. 20, 2018, which claims priority to Chinese Patent Application No. 201710611830.1, filed on Jul. 25, 2017. The disclosures of the aforementioned applications are hereby incorporated by reference in their entireties.

TECHNICAL FIELD

This application relates to the communications field, and in particular, to a data transmission method and apparatus, and a system.

BACKGROUND

Massive multiple-input multiple-output (MIMO) is one of the world-recognized key technologies of the 5th generation mobile communication (5G). To prevent interference between multiple users and improve quality of a signal, the signal may be usually processed in a precoding manner, to implement spatial multiplexing and greatly improve spectrum efficiency.

To improve data transmission reliability, in some currently known transmission schemes, a diversity gain is obtained by using a diversity transmission method. In a possible design, a sending end may process a signal (for example, a demodulation reference signal (DMRS) and a data signal) by using precoding vectors corresponding to different polarization directions, to obtain a larger space diversity gain. This transmission scheme may be referred to as a diversity transmission scheme based on polarization directions.

However, in the prior art, in the diversity transmission scheme based on polarization directions, the precoding vectors used during a data transmission process are not determined based on the different polarization directions, and the precoding vectors do not fit a channel condition well. Therefore, although the diversity transmission scheme is used, a diversity gain cannot reach the optimum, and data transmission reliability needs to be further improved.

SUMMARY

This application provides a data transmission method and apparatus, and a system, to perform channel sounding and feedback based on different transmission schemes, obtain a diversity gain to a greater degree and improve data transmission reliability.

According to a first aspect, a data transmission method is provided, including: receiving, by a terminal device, a first group of precoded reference signals and a second group of precoded reference signals, where the first group of precoded reference signals includes at least one precoded reference signal, and the second group of precoded reference signals includes at least one precoded reference signal; and feeding back, by the terminal device, at least one piece of first indication information based on the first group of precoded reference signals, the second group of precoded reference signals and a transmission scheme that a channel state information (CSI) feedback is based on, where the at least one piece of first indication information is used to determine a plurality of precoding vectors, at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

The data transmission scheme that the CSI feedback is based on includes: a diversity transmission scheme, such as a space-time transmit diversity (STTD) (or referred to as space time block coding (STBC)), a space-frequency transmit diversity (SFTD) (or referred to as space frequency block coding (SFBC)), a cyclic delay diversity (CDD) (for example, a small delay-CDD (SD-CDD), a large delay-CDD (LD-CDD)), CDD based space division multiplexing, polarization based precoder cycling (polarization based precoder cycling), a precoder cycling based space-time transmit diversity, a precoder cycling based space-frequency transmit diversity, a precoder cycling based CDD, or a combination of the foregoing transmission schemes.

Therefore, in this embodiment of this application, the terminal device feeds back the plurality of precoding vectors based on the transmission scheme, and the plurality of precoding vectors may respectively correspond to at least one precoded reference signal in the first group of precoded reference signals and at least one precoded reference signal in the second group of precoded reference signals. Compared with the prior art in which only one precoding vector is fed back, the diversity transmission scheme can be provided with the plurality of precoding vectors for data transmission to obtain a space diversity gain, and this accords more with a requirement of the diversity transmission scheme and helps improve data transmission reliability, thereby facilitating robustness of a communications system.

It should be understood that, in this embodiment of this application, the terminal device is not limited to receiving two groups of precoded reference signals, in other words, a network device is not limited to sending the two groups of precoded reference signals. The network device may send a plurality of groups of precoded reference signals based on different grouping mechanisms, for example, different polarization directions and different antenna panels. The terminal device may feed back the plurality of precoding vectors based on the received plurality groups of precoded reference signals, and any precoding vector in the plurality of precoding vectors corresponds to at least one precoded reference signal in a group of precoded reference signals.

It should also be understood that, that the precoding vector corresponds to the at least one precoded reference signal mentioned herein may include at least two possible cases: In Case 1, one precoding vector corresponds to one precoded reference signal, that is, the precoding vector is a precoding vector corresponding to the precoded reference signal; and in Case 2, one precoding vector corresponds to a plurality of precoded reference signals, that is, the precoding vector is a linear combination of precoding vectors corresponding to the plurality of precoded reference signals.

In one embodiment, the first group of precoded reference signals corresponds to a first polarization direction, and the second group of precoded reference signals corresponds to a second polarization direction.

Therefore, the plurality of precoding vectors may be divided into two groups, a first group of precoding vectors corresponds to the first polarization direction, and a second group of precoding vectors corresponds to the second polarization direction. That is, the plurality of precoding vectors are precoding vectors based on different polarization directions, and this accords more with a requirement of the diversity transmission scheme based on polarization directions, helps maximize a space diversity gain, provides data transmission reliability, and improves robustness of the communications system.

In one embodiment, the first indication information is a precoding matrix indicator (precoding matrix indicator, PMI), the terminal device pre-stores one-to-one correspondences between a plurality of PMIs and a plurality of matrices, and each matrix in the plurality of matrices is used to indicate at least one precoding vector.

In one embodiment of this application, the method in which the terminal device feeds back the at least one piece of first indication information to determine the plurality of precoding vectors may include any one of the following methods:

Method 1: feeding back, by the terminal device, the plurality of precoding vectors to the network device jointly through one PMI; and Method 2: feeding back, by the terminal device, the plurality of precoding vectors to the network device separately through a plurality of PMIs, where one PMI corresponds to one polarization direction.

An example in which the first group of precoded reference signals corresponds to the first polarization direction and the second group of precoded reference signals corresponds to the second polarization direction is used.

If the terminal device uses Method 1 for feedback, then there is one PMI, the PMI indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals.

If the terminal device uses Method 2 for feedback, there are two PMIs, the two PMIs have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors include the first group of precoding vectors and the second group of precoding vectors.

In one embodiment, the method further includes:

receiving, by the terminal device, second indication information, where the second indication information indicates the transmission scheme that the CSI feedback is based on.

Therefore, the terminal device may learn of the transmission scheme for data transmission in advance.

According to a second aspect, a data transmission method is provided, including:

sending, by a network device, a first group of precoded reference signals and a second group of precoded reference signals, where the first group of precoded reference signals includes at least one precoded reference signal, and the second group of precoded reference signals includes at least one precoded reference signal;

receiving, by the network device, at least one piece of first indication information, where the at least one piece of first indication information is related to a transmission scheme that (CSI) feedback is based on; and determining, by the network device, a plurality of precoding vectors based on the at least one piece of first indication information, where at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

The transmission scheme that the CSI feedback is based on includes: a diversity transmission scheme, such as an STTD (or referred to as an STBC), an SFTD (or referred to as an SFBC), a CDD (for example, including an SD-CDD and an LD-CDD), CDD based space division multiplexing, polarization based precoder cycling, a precoder cycling based space-time transmit diversity, a precoder cycling based space-frequency transmit diversity, or a precoder cycling based CDD, and a combination of the foregoing transmission schemes.

Therefore, in one embodiment of this application, the network device sends the first group of precoded reference signals and the second group of precoded reference signals, so that the terminal device can feed back the plurality of precoding vectors based on the transmission scheme that the CSI feedback is based on. The plurality of precoding vectors may respectively correspond to at least one precoded reference signal in the first group of precoded reference signals and at least one precoded reference signal in the second group of precoded reference signals. Compared with the prior art in which only one precoding vector is fed back, the diversity transmission scheme can be provided with the plurality of precoding vectors for data transmission to obtain a space diversity gain, and this accords more with a requirement of the diversity transmission scheme and helps improve data transmission reliability, thereby facilitating robustness of a communications system.

It should be understood that, in one embodiment of this application, the terminal device is not limited to receiving two groups of precoded reference signals, in other words, a network device is not limited to sending the two groups of precoded reference signals. The network device may send a plurality of groups of precoded reference signals based on different grouping mechanisms, for example, different polarization directions and different antenna panels. The terminal device may feed back the plurality of precoding vectors based on the received plurality groups of precoded reference signals, and any precoding vector in the plurality of precoding vectors corresponds to at least one precoded reference signal in a group of precoded reference signals.

It should also be understood that, that the precoding vector corresponds to the at least one precoded reference signal mentioned herein may include two possible cases: In Case 1, one precoding vector corresponds to one precoded reference signal, that is, the precoding vector is a precoding vector corresponding to the precoded reference signal; and in Case 2, one precoding vector corresponds to a plurality of precoded reference signals, that is, the precoding vector is a linear combination of precoding vectors corresponding to the plurality of precoded reference signals.

In one embodiment, the first group of precoded reference signals corresponds to a first polarization direction, and the second group of precoded reference signals corresponds to a second polarization direction.

Therefore, the plurality of precoding vectors may be divided into two groups, a first group of precoding vectors corresponds to the first polarization direction, and a second group of precoding vectors corresponds to the second polarization direction. That is, the plurality of precoding vectors are precoding vectors based on different polarization directions, and this accords more with a requirement of the diversity transmission scheme based on polarization directions, helps maximize a space diversity gain, provides data transmission reliability, and improves robustness of the communications system.

In one embodiment, the first indication information is a PMI, the terminal device pre-stores one-to-one correspondences between a plurality of PMIs and a plurality of matrices, and each matrix in the plurality of matrices is used to indicate at least one precoding vector.

In one embodiment of this application, the terminal device may jointly or separately feed back one or more PMIs to the network device.

An example in which the first group of precoded reference signals corresponds to the first polarization direction and the second group of precoded reference signals corresponds to the second polarization direction is used.

If the terminal device uses Method 1 for feedback, then there is one PMI, the PMI indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals; and the determining, by the network device, a plurality of precoding vectors based on the at least one piece of first indication information includes:

determining, by the network device based on the first matrix indicated by the PMI, the two precoding vectors indicated by each column vector in the first matrix.

If the terminal device uses Method 2 for feedback, there are two PMIs, the two PMIs have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors include the first group of precoding vectors and the second group of precoding vectors; and the determining, by the network device, a plurality of precoding vectors based on the at least one piece of first indication information includes:

determining, by the network device, the first group of precoding vectors and the second group of precoding vectors based on the two second matrices indicated by the two PMIs.

In one embodiment, the method further includes:

sending, by the network device, second indication information, where the second indication information indicates the transmission scheme that the CSI feedback is based on.

Therefore, the network device may indicate the transmission scheme to the terminal device by using the second indication information, so that the terminal device can perform channel sounding and feedback based on the transmission scheme.

According to a third aspect, a data transmission method is provided, including:

receiving, by a network device, a third group of precoded reference signals and a fourth group of precoded reference signals, where the third group of precoded reference signals includes at least one precoded reference signal, and the fourth group of precoded reference signals includes at least one precoded reference signal; and sending, by the network device, at least one piece of third indication information based on a transmission scheme that CSI measurement is based on, where the at least one piece of third indication information is used to determine a plurality of precoding vectors, at least one of the plurality of precoding vectors corresponds to the at least one precoded reference signal in the third group of precoded reference signals, and at least one of the plurality of precoding vectors corresponds to the at least one precoded reference signal in the fourth group of precoded reference signals.

Therefore, in one embodiment of this application, the network device indicates the plurality of precoding vectors based on the transmission scheme that the CSI measurement is based on, and the plurality of precoding vectors may respectively correspond to at least one precoded reference signal in the third group of precoded reference signals and at least one precoded reference signal in the fourth group of precoded reference signals. Compared with the prior art in which only one precoding vector is indicated, the diversity transmission scheme can be provided with the plurality of precoding vectors for data transmission to obtain a space diversity gain, and this accords more with a requirement of the diversity transmission scheme and helps improve data transmission reliability, thereby facilitating robustness of a communications system.

It should be understood that, in one embodiment of this application, the network device is not limited to receiving two groups of precoded reference signals, in other words, a terminal device is not limited to sending the two groups of precoded reference signals. The terminal device may send a plurality of groups of precoded reference signals based on different grouping mechanisms, for example, different polarization directions and different antenna panels. The network device may measure and indicate the plurality of precoding vectors based on the received plurality groups of precoded reference signals, and any precoding vector in the plurality of precoding vectors corresponds to at least one precoded reference signal in a group of precoded reference signals. In addition, the network device may further receive precoded reference signals sent by a plurality of terminal devices, and separately perform channel sounding on the precoded reference signals sent by different terminal devices.

It should also be understood that, that the precoding vector corresponds to the at least one precoded reference signal mentioned herein may include two possible cases: In Case 1, one precoding vector corresponds to one precoded reference signal, that is, the precoding vector is a precoding vector corresponding to the precoded reference signal; and in Case 2, one precoding vector corresponds to a plurality of precoded reference signals, that is, the precoding vector is a linear combination of precoding vectors corresponding to the plurality of precoded reference signals.

In one embodiment, the third group of precoded reference signals corresponds to a first polarization direction, and the fourth group of precoded reference signals corresponds to a second polarization direction.

Therefore, the plurality of precoding vectors may be divided into two groups (for example, denoted as a third group of precoding vectors and a fourth group of precoding vectors), the third group of precoding vectors corresponds to the first polarization direction, and the fourth group of precoding vectors corresponds to the second polarization direction. That is, the plurality of precoding vectors are precoding vectors based on different polarization directions, and this accords more with a requirement of the diversity transmission scheme based on polarization directions, helps maximize a space diversity gain, provides data transmission reliability, and improves robustness of the communications system.

In one embodiment, the third indication information is a PMI, the terminal device pre-stores one-to-one correspondences between a plurality of PMIs and a plurality of matrices, and each matrix in the plurality of matrices is used to indicate at least one precoding vector.

In one embodiment of this application, the method in which the network device sends the at least one piece of third indication information to determine the plurality of precoding vectors may include any one of the following methods:

Method 1: indicating, by the network device, the plurality of precoding vectors to the terminal device jointly through one PMI; and Method 2: indicating, by the network device, the plurality of precoding vectors to the terminal device separately through a plurality of PMIs, where one PMI corresponds to one polarization direction.

An example in which the third group of precoded reference signals corresponds to the first polarization direction and the fourth group of precoded reference signals corresponds to the second polarization direction is used.

If the network device uses Method 1 to indicate the plurality of precoding vectors, there is one PMI, the PMI indicates a third matrix in the plurality of matrices, each column vector in the third matrix is used to indicate two precoding vectors in the plurality of precoding vectors, one of the two precoding vectors corresponds to the at least one precoded reference signal in the third group of precoded reference signals, and the other one of the two precoding vectors corresponds to the at least one precoded reference signal in the fourth group of precoded reference signals.

If the network device uses Method 2 to indicate the plurality of precoding vectors, there are two PMIs, the two PMIs have a one-to-one correspondence with two second matrices in the plurality of matrices, each PMI indicates a fourth matrix, one of the two fourth matrices is used to indicate a third group of precoding vectors, the third group of precoding vectors corresponds to the at least one precoded reference signal in the third group of precoded reference signals, the other one of the two fourth matrices is used to indicate a fourth group of precoding vectors, the fourth group of precoding vectors corresponds to the at least one precoded reference signal in the fourth group of precoded reference signals, and the plurality of precoding vectors include the third group of precoding vectors and the fourth group of precoding vectors.

In one embodiment of this application, the network device may measure and indicate, based on a particular transmission scheme, the at least one piece of third indication information used to determine the plurality of precoding vectors, or may measure and indicate, based on a plurality of transmission schemes, the at least one piece of third indication information that is used for a transmission scheme for uplink transmission and that is used to determine the plurality of precoding vectors.

If the network device performs measurement based on a particular transmission scheme, the indicating, by the network device, at least one piece of third indication information based on a transmission scheme that CSI measurement is based on includes:

indicating, by the network device, the at least one piece of third indication information based on one transmission scheme.

The transmission scheme that the CSI measurement is based on includes: a diversity transmission scheme, such as an STTD (or referred to as an STBC), an SFTD (or referred to as an SFBC), a CDD (for example, including an SD-CDD and an LD-CDD), CDD based space division multiplexing, polarization based precoder cycling, a precoder cycling based space-time transmit diversity, a precoder cycling based space-frequency transmit diversity, or a precoder cycling based CDD, and a combination of the foregoing transmission schemes.

The transmission scheme for uplink data transmission may be predefined (for example, defined by a protocol), and preset in the network device and the terminal device. The network device may perform measurement and indication based on the predefined transmission scheme. The terminal device may perform data transmission based on the predefined transmission scheme and the plurality of precoding vectors indicated by the network device. Compared with another scheme, this scheme can reduce measurement complexity.

If the network device performs measurement based on a plurality of transmission schemes, the indicating, by the network device, at least one piece of third indication information based on a transmission scheme that CSI measurement is based on includes:

indicating, by the network device, the at least one piece of third indication information based on the plurality of transmission schemes; and the method further includes:

sending, by the network device, fourth indication information, where the fourth indication information indicates the transmission scheme for uplink data transmission.

The transmission scheme for uplink data transmission includes: a diversity transmission scheme, such as an STTD (or referred to as an STBC), an SFTD (or referred to as an SFBC), a CDD (for example, including an SD-CDD and an LD-CDD), CDD based space division multiplexing, polarization based precoder cycling, a precoder cycling based space-time transmit diversity, a precoder cycling based space-frequency transmit diversity, or a precoder cycling based CDD, and a combination of the foregoing transmission schemes.

The network device may perform measurement based on the plurality of transmission schemes, selects a transmission scheme with a best measurement result for uplink data transmission, and further indicates the transmission scheme for uplink data transmission to the terminal device, so that the terminal device transmits data based on the transmission scheme and the plurality of precoding vectors. By using this scheme, a transmission scheme applicable to a current channel status can be better selected, to obtain a diversity gain to the greatest extent.

It may be understood that the transmission scheme that the CSI measurement is based on may be the same as or different from the transmission scheme for uplink data transmission.

In one embodiment, the method further includes:

sending, by the network device, fifth indication information, where the fifth indication information is used to instruct the terminal device to send a plurality of groups of precoded reference signals.

According to a fourth aspect, a data transmission method is provided, including:

sending, by a terminal device, a third group of precoded reference signals and a fourth group of precoded reference signals, where the third group of precoded reference signals includes at least one precoded reference signal, and the fourth group of precoded reference signals includes at least one precoded reference signal;

receiving, by the terminal device, at least one piece of third indication information, where the at least one piece of third indication information is related to a transmission scheme that CSI measurement is based on; and determining, by the terminal device, a plurality of precoding vectors based on the at least one piece of third indication information, where at least one of the plurality of precoding vectors corresponds to the at least one precoded reference signal in the third group of precoded reference signals, and at least one of the plurality of precoding vectors corresponds to the at least one precoded reference signal in the fourth group of precoded reference signals.

Therefore, in one embodiment of this application, the network device indicates the plurality of precoding vectors based on the transmission scheme that the CSI measurement is based on, the third group of precoded reference signals and the fourth group of precoded reference signals, and the plurality of precoding vectors may respectively correspond to at least one precoded reference signal in the third group of precoded reference signals and at least one precoded reference signal in the fourth group of precoded reference signals. Compared with the prior art in which only one precoding vector is indicated, the diversity transmission scheme can be provided with the plurality of precoding vectors for data transmission to obtain a space diversity gain, and this accords more with a requirement of the diversity transmission scheme and helps improve data transmission reliability, thereby facilitating robustness of a communications system.

It should be understood that, in this embodiment of this application, the network device is not limited to receiving two groups of precoded reference signals, in other words, a terminal device is not limited to sending the two groups of precoded reference signals. The terminal device may send a plurality of groups of precoded reference signals based on different grouping mechanisms, for example, different polarization directions and different antenna panels. The network device may indicate the plurality of precoding vectors based on the received plurality groups of precoded reference signals, and any precoding vector in the plurality of precoding vectors corresponds to at least one precoded reference signal in a group of precoded reference signals. In addition, the network device may further receive precoded reference signals sent by a plurality of terminal devices, and separately perform channel sounding on the precoded reference signals sent by different terminal devices.

It should also be understood that, that one precoding vector corresponds to the at least one precoded reference signal mentioned herein may include two possible cases: In Case 1, one precoding vector corresponds to one precoded reference signal, that is, the precoding vector is a precoding vector corresponding to the precoded reference signal; and in Case 2, one precoding vector corresponds to a plurality of precoded reference signals, that is, the precoding vector is a linear combination of precoding vectors corresponding to the plurality of precoded reference signals.

In one embodiment, the third group of precoded reference signals corresponds to a first polarization direction, and the fourth group of precoded reference signals corresponds to a second polarization direction.

Therefore, the plurality of precoding vectors may be divided into two groups (for example, denoted as a third group of precoding vectors and a fourth group of precoding vectors), the third group of precoding vectors corresponds to the first polarization direction, and the fourth group of precoding vectors corresponds to the second polarization direction. That is, the plurality of precoding vectors are precoding vectors based on different polarization directions, and this accords more with a requirement of the diversity transmission scheme based on polarization directions, helps maximize a space diversity gain, provides data transmission reliability, and improves robustness of the communications system.

In one embodiment, the third indication information is a PMI, the terminal device pre-stores one-to-one correspondences between a plurality of PMIs and a plurality of matrices, and each matrix in the plurality of matrices is used to indicate at least one precoding vector.

In one embodiment of this application, the network device may send one or more PMIs to the terminal device in a manner of joint indication or separate indication.

An example in which the third group of precoded reference signals corresponds to the first polarization direction and the fourth group of precoded reference signals corresponds to the second polarization direction is used.

If there is one PMI, the PMI indicates a third matrix in the plurality of matrices, each column vector in the third matrix is used to indicate two precoding vectors in the plurality of precoding vectors, one of the two precoding vectors corresponds to the at least one precoded reference signal in the third group of precoded reference signals, and the other one of the two precoding vectors corresponds to the at least one precoded reference signal in the fourth group of precoded reference signals.

The determining, by the terminal device, a plurality of precoding vectors based on the at least one piece of third indication information includes:

determining, by the terminal device based on the third matrix indicated by the PMI, the two precoding vectors indicated by each column vector in the third matrix.

If there are two PMIs, the two PMIs have a one-to-one correspondence with two second matrices in the plurality of matrices, each PMI indicates a fourth matrix, one second matrix in the two fourth matrices is used to indicate a first group of precoding vectors, the third group of precoding vectors corresponds to the at least one precoded reference signal in the third group of precoded reference signals, the other one of the two fourth matrices is used to indicate a fourth group of precoding vectors, the fourth group of precoding vectors corresponds to the at least one precoded reference signal in the fourth group of precoded reference signals, and the plurality of precoding vectors include the third group of precoding vectors and the fourth group of precoding vectors.

The determining, by the terminal device, a plurality of precoding vectors based on the at least one piece of third indication information includes:

determining, by the terminal device, the first group of precoding vectors and the second group of precoding vectors based on the two second matrices indicated by the two PMIs.

In one embodiment, the method further includes:

receiving, by the terminal device, fourth indication information, where the fourth indication information indicates a transmission scheme for uplink data transmission.

In one embodiment of this application, the transmission scheme that the CSI measurement is based on may be the same as the transmission scheme for uplink data transmission. For example, the transmission scheme may be predefined (for example, defined by a protocol) and set in the network device and the terminal device. The network device may perform measurement and indicate based on the predefined transmission scheme, and the terminal device may perform data transmission based on the predefined transmission scheme and the plurality of precoding vectors indicated by the network device. The transmission scheme that the CSI measurement is based on may be different from the transmission scheme for uplink data transmission. For example, the network device may perform measurement in advance based on a plurality of transmission schemes, and notify, respectively by using the fourth indication information and the third indication information, the terminal device of a transmission scheme with a best measurement result and the plurality of corresponding precoding vectors.

In one embodiment, the method further includes:

receiving, by the terminal device, fifth indication information, where the fifth indication information is used to instruct the terminal device to send a plurality of groups of precoded reference signals.

According to a fifth aspect, a data transmission apparatus is provided, including a sending module and a receiving module, to perform the data transmission method according to the first aspect to the fourth aspect and any possible implementation in the first aspect to the fourth aspect. The sending module is configured to perform sending-related functions, and the receiving module is configured to perform receiving-related functions.

In one embodiment, the apparatus is a communications chip. The sending module may be an input circuit or an interface of the communications chip, and the sending module may be an output circuit or an interface of the communications chip.

In another embodiment, the communications apparatus is a terminal device, the sending module may be a transmission machine or a transmitter, and the receiving module may be a receiving machine or a receiver.

In another embodiment, the communications apparatus is a network device, the sending module may be a transmission machine or a transmitter, and the receiving module may be a receiving machine or a receiver.

In one embodiment, the apparatus further includes modules configured to perform the data transmission method according to the first aspect to the fourth aspect and any possible implementation in the first aspect to the fourth aspect.

According to a sixth aspect, a data transmission apparatus is provided, including a processor and a memory. The memory is configured to store a computer program, and the processor is configured to: invoke and run the computer program from the memory to enable the apparatus to perform the data transmission method according to the first aspect to the fourth aspect or any possible implementation of the first aspect to the fourth aspect.

In one embodiment, there are one or more processors, and there are one or more memories.

In one embodiment, the memory may be integrated with the processor, or the memory and the processor are separately disposed.

In one embodiment, the apparatus further includes a transmission machine (or a transmitter) and a receiving machine (or a receiver).

In a possible embodiment, a terminal device is provided, including a transceiver, a processor, and a memory. The processor is configured to control the transceiver to receive and send a signal, the memory is configured to store a computer program, and the processor is configured to: invoke and run the computer program from the memory to enable the terminal device to perform the method according to the first aspect or any possible implementation of the first aspect, or the method according to the fourth aspect or any possible implementation of the fourth aspect.

In another possible embodiment, a network device is provided, including a transceiver, a processor, and a memory. The processor is configured to control the transceiver to receive and send a signal, the memory is configured to store a computer program, and the processor is configured to: invoke and run the computer program from the memory to enable the network device to perform the method according to the second aspect or any possible implementation of the second aspect, or the method according to the third aspect or any possible implementation of the third aspect.

According to a seventh aspect, a system is provided, and the system includes the foregoing terminal device and the foregoing network device.

According to an eighth aspect, a processor is provided, including: an input circuit, an output circuit and a processing circuit. The processing circuit is configured to: receive a signal by using the input circuit, and transmit a signal by using the output circuit, to enable the processor to perform the method according to the first aspect to the fourth aspect and any possible implementation of the first aspect to the fourth aspect.

During specific implementation, the processor may be a chip, the input circuit may be an input pin, the output circuit may be an output pin, and the processing circuit may be a transistor, a gate circuit, a flip-flop, various logic circuits, or the like. An input signal received by the input circuit may be received and input by, for example but not limited to, a receiver, a signal output by the output circuit may be, for example but not limited to, output to a transmitter and transmitted by the transmitter, and the input circuit and the output circuit may be a same circuit. The circuit is separately used as the input circuit and the output circuit at different moments. A specific implementation of the processor and the circuits is not limited in this embodiment of this application.

According to a ninth aspect, a processing apparatus is provided, including: a memory and a processor. The processor is used to read an instruction stored in the memory, and may receive a signal through a receiver and transmit a signal through a transmitter, to perform the method according to the first aspect to the fourth aspect and any possible implementation of the first aspect to the fourth aspect.

In one embodiment, there are one or more processors, and there are one or more memories.

In one embodiment, the memory may be integrated with the processor, or the memory and the processor are separately disposed.

During specific implementation, the memory may be a non-transitory (non-transitory) memory such as a read-only memory (Read Only Memory, ROM). The memory and the processor may be integrated in a same chip, or may be disposed in different chips. This embodiment of this application does not constitute a limitation on a type of the memory and a disposition manner of the memory and the processor.

According to a tenth aspect, a chip is provided, including a processor and a memory. The memory is configured to store a computer program, and the processor is configured to: invoke and run the computer program from the memory. The computer program is used to implement the method according to the first aspect to the fourth aspect and any possible implementation of the first aspect to the fourth aspect.

According to an eleventh aspect, a computer readable medium is provided. The computer readable medium stores a computer program (also referred to as code or an instruction). When run on a computer, the computer program causes the computer to perform the method according to the first aspect to the fourth aspect and any possible implementation of the first aspect to the fourth aspect.

According to a twelfth aspect, a computer program product is provided. The computer program product includes a computer program (also referred to as code or an instruction). When run, the computer program causes the computer to perform the method according to the first aspect to the fourth aspect and any possible implementation of the first aspect to the fourth aspect.

In some possible implementations, the second indication information is set in channel state information (channel state information, CSI) reporting setting (CSI reporting setting) information.

In some possible implementations, the fourth indication information is set in the CSI reporting setting information.

Based on the foregoing designs, in the embodiments of this application, channel sounding and feedback can be performed based on different transmission schemes, and this helps improve data transmission reliability and can further improve robustness of the communications system.

DESCRIPTION OF EMBODIMENTS

The following describes technical solutions of this application with reference to accompanying drawings.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

Figure 1:
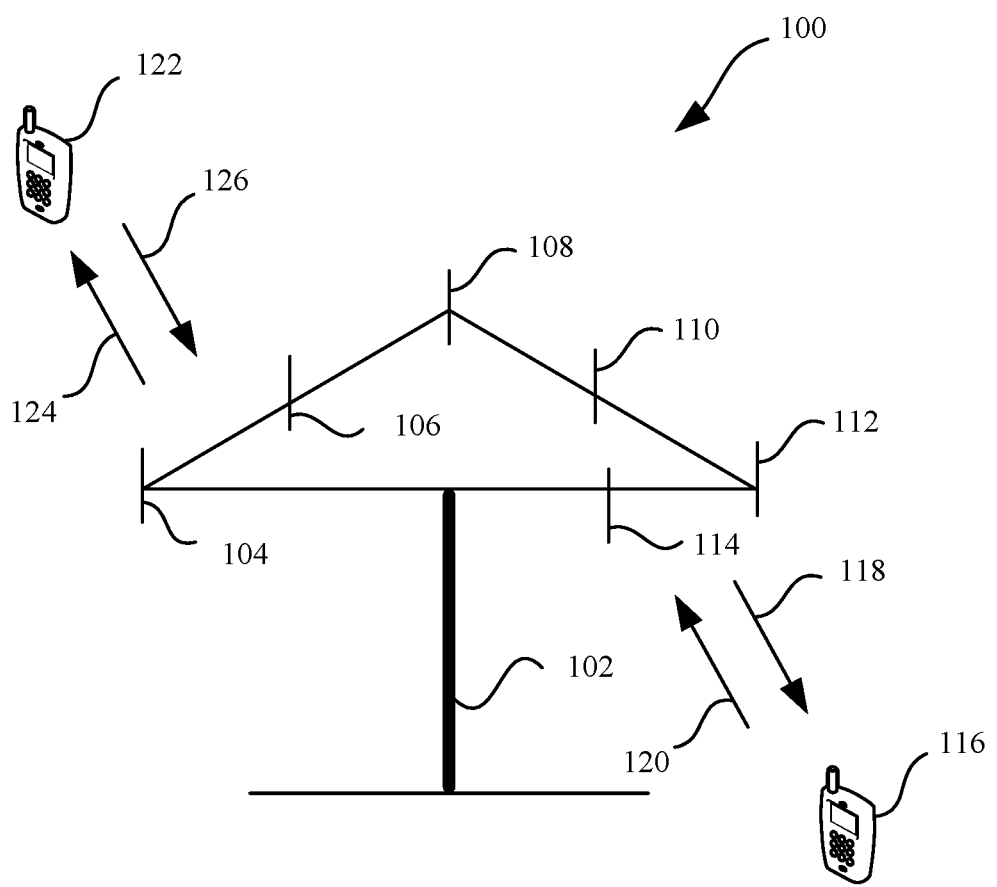
FIG. 1 is a schematic diagram of a communications system applicable to a data transmission method according to an embodiment of this application.

For ease of understanding of the embodiments of this application, first, a communications system applicable to the embodiments of this application is described in detail with reference to FIG. 1. FIG. 1 is a schematic diagram of a communications system applicable to a data transmission method and apparatus according to the embodiments of this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain, and a person of ordinary skill in the art may understand that both the transmitter chain and the receiver chain may include a plurality of components (such as a processor, a modulator, a multiplexer, a demodulator, a demultiplexer, and an antenna) related to signal sending and receiving.

It should be understood that the network device may be any device provided with a wireless receiving and sending function or any chip that can be disposed in the device, and the device includes but is not limited to a base station (for example, a NodeB, an evolved NodeB (eNodeB), a network device (such as a transmission point (TP), a transmission reception point (TRP), a base station and a small base station device) in the 5th generation (5G) communications system, a network device in a future communications system, an access node in a Wi-Fi system, a wireless relay node, or a wireless backhaul node.

The network device 102 may communicate with a plurality of terminal devices (such as a terminal device 116 and a terminal device 122). The network device 102 may communicate with any quantity of terminal devices similar to the terminal device 116 or 122.

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet computer (pad), a computer having a wireless receiving and sending function, a virtual reality (VR) terminal device, an augmented reality (AR) terminal device, a wireless terminal in industrial control, a wireless terminal in self driving, a wireless terminal in telemedicine (remote medical), a wireless terminal in a smart grid (smart grid), a wireless terminal in transportation safety, a wireless terminal in a smart city, a wireless terminal in a smart home, or the like. An application scenario is not limited in this embodiment of this application. In this application, the foregoing terminal device and the chip that can be disposed in the foregoing terminal device are collectively referred to as a terminal device.

As shown in FIG. 1, the terminal device 116 communicates with the antennas 112 and 114, where the antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

The embodiments of this application may be applicable to downlink data transmission and uplink data transmission, and may further be applicable to device-to-device (D2D) data transmission. For example, for downlink data transmission, a device on a sending end is a base station, and a device on a corresponding receiving end is UE; for uplink data transmission, a device on a sending end is UE, and a device on a corresponding receiving end is a base station; and for D2D data transmission, a sending device is UE, and a corresponding receiving device is also UE. This is not limited in the embodiments of this application.

For example, in a frequency division duplex (FDD) system, for example, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, an antenna group may be designed to communicate with a terminal device in a sector within coverage of the network device 102. In a process in which the network device 102 communicates with the terminal devices 116 and 122 respectively by using the forward links 118 and 124, a transmit antenna of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

The network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communications apparatus, or store in a memory) a particular quantity of data bits to be sent, by using a channel, to the wireless communication receiving apparatus. The data bit may be included in a transport block (or a plurality of transport blocks) of data, and the transport block may be segmented to generate a plurality of code blocks.

In addition, the communications system 100 may be a public land mobile network (PLMN) network or a device-to-device (D2D) network or a machine-to-machine (M2M) network or another network. FIG. 1 is only a simplified schematic diagram for ease of understanding, the network may further include another network device, and the another network device is not shown in FIG. 1.

Figure 2:
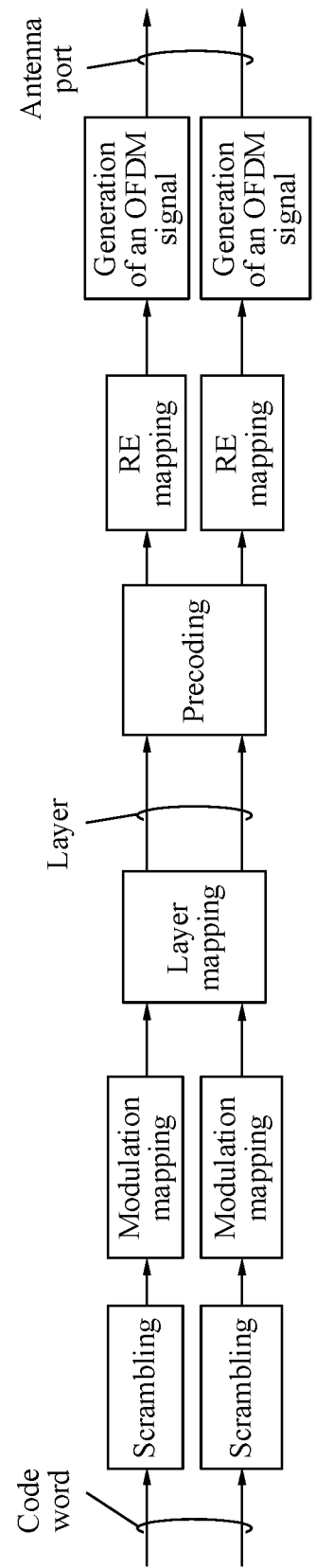
FIG. 2 is a schematic diagram of a downlink physical channel processing procedure used in an existing LTE system.

For ease of understanding of the embodiments of this application, a processing procedure of a downlink physical channel in an LTE system is briefly described below with reference to FIG. 2. FIG. 2 is a schematic diagram of a downlink physical channel processing procedure used in an existing LTE system. A processing object of the downlink physical channel processing procedure is a code word, and the code word is usually a bit stream on which coding (including at least channel coding) is performed. A scrambled bit stream is generated by scrambling (scrambling) the code word (code word). A modulated symbol stream is obtained by performing modulation mapping on the scrambled bit stream. The modulated symbol stream is mapped, through layer mapping, to a plurality of layers. For ease of distinction and description, in the embodiments of this application, the symbol stream on which layer mapping is performed may be referred to as a layer mapping space layer (or referred to as a layer mapping spatial flow or a layer mapping symbol stream). A plurality of precoding data flows (or referred to as precoding symbol streams) are obtained by precoding the layer mapping space layer. The precoding symbol streams are mapped, through resource element (RE) mapping, to a plurality of REs. An OFDM symbol stream is generated by performing orthogonal frequency division multiplexing (OFDM) modulation on these REs. The OFDM symbol stream is subsequently transmitted through an antenna port.

In the precoding technology, a to-be-transmitted signal may be pre-processed on a sending end when a channel status is known, that is, the to-be-transmitted signal may be processed by using a precoding matrix adapted to a channel resource, so that a precoded to-be-transmitted signal matches a channel and complexity of eliminating inter-channel impact by the receiving end is reduced. Therefore, received signal quality (for example, a signal to interference plus noise ratio (SINR)) is improved by precoding the to-be-transmitted signal. Therefore, by using the precoding technology, transmission between a sending end device and a plurality of receiving end devices on a same time-frequency resource can be implemented, that is, multi-user multiple input multiple output (multiple user multiple input multiple output, MU-MIMO) is implemented. It should be noted that, descriptions related to the precoding technology are merely used as an example, and are not used to limit a protection scope of the embodiments of this application. During specific implementation, precoding may further be performed in another manner (for example, precoding is performed by using a preset precoding matrix or a weighting processing manner when a channel matrix cannot be known), and specific content is not described herein again.

To obtain a precoding matrix adapted to the channel, the sending end usually performs channel estimation in advance by sending a reference signal, and obtains channel state information (CSI) obtained through channel sounding by the receiving end, to determine a relatively accurate precoding matrix to precode the to-be-transmitted data. The reference signal used for channel sounding may be referred to as a non-precoded reference signal, and the receiving end may obtain an entire channel between a sending antenna and a receiving antenna through estimation based on the non-precoded reference signal.

With the development of the multiple-antenna technology, a quantity of antenna ports is relatively large, performing channel sounding (e.g., CSI measurement) by using a non-precoded reference signal causes relatively large pilot overheads, a transmit power of each reference signal is relatively low, and accuracy of channel sounding is relatively low. Therefore, a beamformed reference signal is provided. Because the beamformed reference signal may be used to measure an equivalent channel matrix, and the terminal device obtains a beamformed equivalent channel through measurement, the quantity of antenna ports is reduced, and the pilot overheads are relatively small, so that the transmit power is improved, and the accuracy of channel sounding is improved.

It should be noted that, compared with a non-precoded reference signal, the beamformed reference signal may further be referred to as a precoded reference signal. The precoded reference signal may be used to select a precoding vector, in other words, to select an antenna port and a beam. In the embodiments of this application, one antenna port may correspond to one precoding vector. When a sending end transmits a precoded reference signal based on a precoding vector corresponding to an antenna port, because the transmitted precoded reference signal has particular directivity, the precoded reference signal transmitted by the antenna port may be understood as a beam in a particular direction. In brief, one antenna port corresponds to one beam.

Therefore, both a non-precoded reference signal and a beamformed reference signal can be used for channel sounding. The former is used to measure the entire channel, and can be estimated to obtain the channel matrix, thereby determining the precoding matrix, where the precoding matrix can be used by a sending end device to precode data; and the latter is used to measure the equivalent channel, and can be estimated to obtain the equivalent channel matrix, thereby determining the precoding vector corresponding to the antenna port (in other words, the beam), that is, determining the precoding vector corresponding to the antenna port configured to transmit data. Although the receiving end feeds back CSI based on either of the two reference signals, it can be understood that content indicated by CSI fed back based on different reference signals may be different.

It should be understood that a communication mode applicable to the reference signal and a type of the reference signal are not specifically limited in this application. For downlink data transmission, the sending end may be a network device, the receiving end may be a terminal device, and the reference signal may be, for example, a channel state information reference signal (CSI-RS); for uplink data transmission, the sending end may be a terminal device, the receiving end may be a network device, and the reference signal may be, for example, a sounding reference signal (sounding reference signal, SRS); and for device to device (D2D) data transmission, the sending end may be a terminal device, the receiving end may also be a terminal device, and the reference signal may be, for example, the SRS. However, it should be understood that the foregoing types of reference signals listed above are merely for schematic descriptions, and do not constitute any limitation on this application. This application does not exclude the possibility of implementing a same or similar function by using another reference signal.

To improve data transmission reliability, in some currently known transmission schemes, a diversity gain is obtained by using a diversity transmission method, to adapt to a scenario in which a channel environment changes quickly or another scenario in which the CSI cannot be obtained accurately. In a possible implementation, a sending end may process a signal (for example, a DMRS and a data signal) by using precoding vectors corresponding to different polarization directions, to obtain a space diversity gain. This transmission scheme may be referred to as diversity transmission based on polarization directions. It should be understood that, in the diversity transmission scheme based on polarization directions, different polarization directions of antenna ports are used, and data is precoded by using precoding vectors corresponding to the ports of different polarization directions, to obtain gains in different polarization directions, thereby obtaining the space diversity gain.

However, in the existing technology, when using the diversity transmission scheme, the sending end does not obtain the CSI obtained by measurement based on the foregoing transmission scheme. In reality, when performing channel sounding, the receiving end usually performs channel sounding based on a closed-loop spatial multiplexing (CLSM) transmission scheme, the CSI fed back is usually applicable to the CLSM transmission scheme and cannot satisfy a requirement of diversity transmission.

For ease of understanding of the embodiments of this application, a method for indicating (or feeding back) a precoding vector by the receiving end to the sending end based on a received beamformed precoded reference signal in the prior art is briefly described herein.

Figure 3:
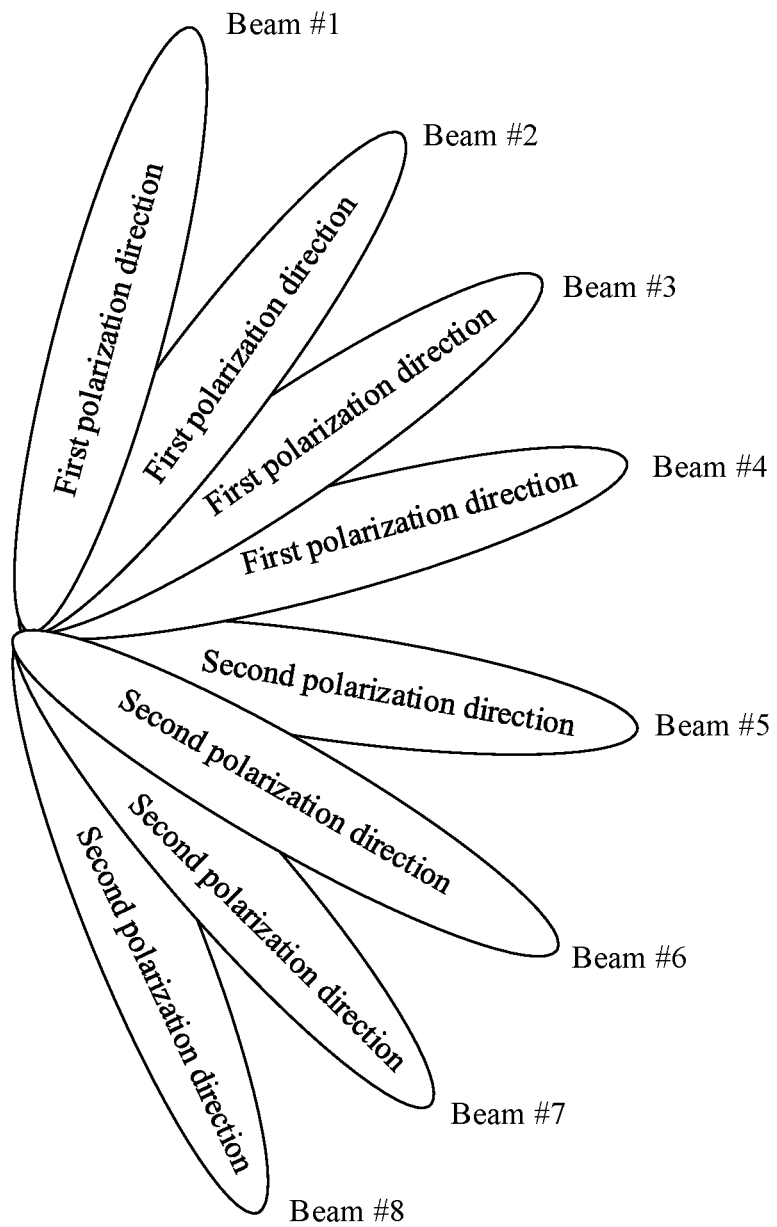
FIG. 3 is a schematic diagram of a plurality of beams.

First, the beamformed reference signal is described with reference to the accompanying drawings. FIG. 3 shows a plurality of beamformed reference signals. FIG. 3 shows eight beamformed reference signals. The eight beamformed reference signals may correspond to the eight beams (that is, the beam #1 to the beam #8) shown in the figure, and the eight beamformed reference signals may be transmitted through ports of two polarization directions (that is, the first polarization direction and the second polarization direction in the figure). Therefore, the eight beams have a one-to-one correspondence with the eight ports. For example, the beam #1 may correspond to the port #1, the beam #2 may correspond to the port #2, and so on, and the remaining correspondences are not listed one by one herein. A precoded reference signal sent by each port may be obtained by precoding based on a precoding vector. Precoding vectors used by any two ports may be the same or different.

It should be understood that FIG. 3 shows the eight beams merely for ease of understanding, and describes the one-to-one correspondences between the eight beams and the eight ports. However, this should not constitute any limitation on this application, and a quantity of the beams and a quantity of the ports are not limited in this application.

The receiving end performs channel sounding based on the eight received precoded reference signals, performs measurement based on channel quality obtained by measurement and a plurality of different measurement criteria, and indicates (or feeds back) a port corresponding to an optimal precoding vector under a particular measurement criterion to the sending end. For example, the measurement criterion may include but is not limited to: signal-to-interference-plus-noise ratio (SINR) maximization, Shannon capacity maximization or minimization of a mean square error (MMSE) between a quantized equivalent channel matrix corresponding to a PMI and a measurement equivalent channel matrix.

In one embodiment, the receiving end may notify, based on the channel quality obtained by measurement and a criterion for optimal channel quality, the sending end of a port corresponding to an equivalent channel with best performance by using a PMI. The PMI is used to indicate a column vector (corresponding to a case in which a rank is 1) or a matrix (corresponding to a case in which a rank is greater than 1), and the column vector or matrix indicated by the PMI may be used to determine a port corresponding to the precoding vector.

For example, assuming that an index value of a codebook (codebook) included in the PMI is 12, a column vector corresponding to the index having the value of 12 is:

if the rank is 1, $$\frac{1}{\sqrt{2}}\begin{bmatrix} e_3^{(4)} \\ \alpha e_3^{(4)} \end{bmatrix};$$

and
if the rank is greater than 1, $$\frac{1}{\sqrt{2}}\begin{bmatrix} e_0^{(4)} & e_3^{(4)} \\ \alpha e_0^{(4)} & \alpha e_3^{(4)} \end{bmatrix}.$$

An example in which the rank is 1 is used. The column vector indicates that the selected precoding vectors correspond to the two polarization directions, where 4 indicates a quantity of the ports, 3 indicates a currently selected port, the two $e_3^{(4)}$ are distinguished by using a polarization antenna phase factor (co-phase) $\alpha$, and a value of the polarization antenna phase factor $\alpha$ may be any value in [1, −1, j, −j]. The column vector indicates that a precoding vector corresponding to a third port in the first polarization direction and a third port in the second polarization direction can be used for data transmission.

In one embodiment, if the rank is greater than 1, it indicates that a precoding vector used for one data layer is a precoding vector corresponding to a zeroth port in the first polarization direction and a zeroth port in the second polarization direction, and a precoding vector used for another data layer is a precoding vector corresponding to a third port in the first polarization direction and a third port in the second polarization direction.

It can be seen that the precoding vector fed back (or indicated) in the prior art is formed by splicing the first polarization direction and the second polarization direction by using the polarization antenna phase factor. In other words, this can be understood as combining ports in two polarization directions into one port, and precoding vectors of the two polarization directions are not independent of each other. This is not applicable to the diversity transmission scheme based on polarization directions for data transmission.

For example, in STTD or SFTD, the precoding vectors obtained based on the foregoing method cannot satisfy a requirement of using two precoding vectors corresponding to different polarization directions respectively in two data layers for precoding, and in a CDD or polarization based precoder cycling, a plurality of precoding vectors corresponding to different polarization directions cannot be obtained based on the foregoing method.

Based on the above, although the sending end device is expected to precode data by using the precoding vectors corresponding to different polarization directions to obtain the space diversity gain, a method to satisfy this requirement is not provided in the current technology, and this is against achieving maximization of a space diversity gain. Therefore, data transmission reliability needs to be further improved.

In view of this, this application provides a data transmission method in which precoding vectors applicable to different transmission schemes can be obtained by channel sounding and feedback based on the transmission schemes, helping to maximize the space diversity gain and improve data transmission reliability.

The data transmission method provided in the embodiments of this application is described in detail below by using a transmission scheme based on polarization directions as an example with reference to the accompanying drawings. However, it should be understood that the transmission scheme applicable to this application is not limited to the polarization direction based diversity transmission. The polarization direction may be used merely as a factor considered when the precoded reference signals are grouped. The sending end may further send a plurality of groups of precoded reference signals based on another different grouping mechanism, for example, different antenna panels. In this case, the sending end may send more groups of precoded reference signals based on a quantity of the antenna panels, and obtain precoding vectors for different antenna panels by using the method provided in this application, to obtain the diversity gain and improve data transmission reliability.

It should be noted that, in the embodiments of this application, the antenna port (or the port for short) may be understood as a reference signal port, and one reference signal corresponds to one antenna port. The reference signal port described herein may include, for example, a channel state information-reference signal CSI-RS port and a DMRS port for downlink data transmission, or an SRS port and a DMRS port for uplink data transmission, or an SRS port and a DMRS port for D2D data transmission. Reference signals of different types are used to implement different functions. The antenna port described in this application may be a CSI-RS port, or a DMRS port, or may be an SRS port. A person skilled in the art may understand the meaning.

It further should be noted that, in the embodiments of this application, the transmission scheme (or referred to as a transmission manner or a transmission mechanism) may be a transmission scheme defined in an existing protocol (for example, an LTE protocol), or may be a transmission scheme defined in a related protocol in future 5G, and this is not specifically limited in the embodiments of this application. It should be understood that a transmission scheme can be understood as a name to represent a technical solution used to transmit data, and should not constitute any limitation on the embodiments of this application. The embodiments of this application do not exclude a possibility of replacing the transmission scheme with another name in a future protocol.

Downlink data transmission and uplink data transmission are respectively used below as examples, and the data transmission method provided in this application is described in detail with reference to the accompanying drawings.

It should be understood that the technical solution of this application may be applied to a wireless communications system that uses the multiple-antenna technology. For example, the wireless communications system may be the communications system 100 shown in FIG. 1. The communications system may include at least one network device and at least one terminal device, and the network device and the terminal device may communicate with each other through a wireless air interface. For example, the network device in the communications system may correspond to the network device 102 shown in FIG. 1, and the terminal device may correspond to the terminal device 116 or 122 shown in FIG. 1.

It should also be understood that this application does not constitute specific limitation on specific content of a precoded reference signal. In the embodiments of this application, the precoded reference signal is used for equivalent channel sounding. In downlink data transmission, the precoded reference signal may be, for example, a precoded CSI-RS. In uplink data transmission, the precoded reference signal may be, for example, a precoded SRS. However, the foregoing examples are merely for schematic descriptions, and should not constitute any limitation on this application. This application does not exclude the possibility of defining another reference signal in a future protocol to implement a same or similar function.

It should also be understood that, in the embodiments shown below, the first, the second, the third and the fourth are merely used to distinguish different objects, for example, different precoded reference signals, different pieces of indication information, and different matrices used to determine a port, and should not constitute any limitation on this application.

Figure 4:
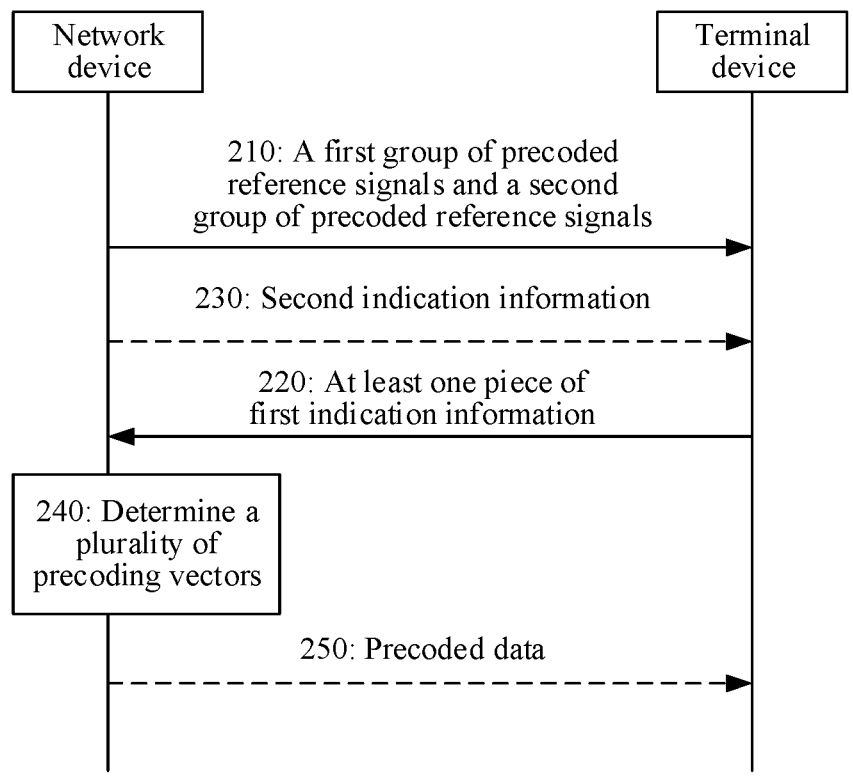
FIG. 4 is a schematic flowchart of a data transmission method according to an embodiment of this application.

FIG. 4 is a schematic flowchart, from a device interaction perspective, of a data transmission method 200 according to an embodiment of this application. FIG. 4 shows a downlink data transmission scenario. As shown in the figure, the method 200 shown in FIG. 4 may include operation 210 to operation 250.

In operation 210, a network device sends a first group of precoded reference signals and a second group of precoded reference signals.

In one embodiment, the first group of precoded reference signals may include at least one precoded reference signal, and the second group of precoded reference signals may include at least one precoded reference signal. The two groups of precoded reference signals may be distinguished by using different polarization directions. Optionally, the first group of precoded reference signals corresponds to a first polarization direction, and the second group of precoded reference signals corresponds to a second polarization direction. In other words, a precoding vector used to precode reference signals to obtain the first group of precoded reference signals corresponds to the first polarization direction, and a precoding vector used to precode reference signals to obtain the second group of precoded reference signals corresponds to the second polarization direction. As an example rather than limitation, the first polarization direction may be a horizontal polarization direction, and the second polarization direction may be a vertical polarization direction. Alternatively, the first polarization direction may be a vertical polarization direction, and the second polarization direction may be a horizontal polarization direction.

A correspondence between a precoded reference signal and a polarization direction herein may be understood as follows: Because a precoded reference signal has a one-to-one correspondence with an antenna port, each precoded reference signal may define a port, each port may be a port formed by performing a precoding operation in a particular polarization direction by using a precoding vector, and each antenna port corresponds to one polarization direction, the precoded reference signal also has a correspondence with the polarization direction.

It can be understood that although some precoded reference signals correspond to a same polarization direction, precoding vectors used by the network device to precode the reference signals of a plurality of ports may be different. If reference signals of a plurality of ports in different polarization directions are precoded by using different precoding vectors, a plurality of precoded reference signals corresponding to the plurality of ports can respectively indicate different directions.

Referring to FIG. 3 again, according to the foregoing descriptions, precoded reference signals corresponding to the beam #1 to the beam #4 in the figure may be grouped into one group, for example, the first group of precoded reference signals, and precoded reference signals corresponding to the beam #5 to the beam #8 are grouped into one group, for example, the second group of precoded reference signals.

Correspondingly, in operation 210, a terminal device receives the first group of precoded reference signals and the second group of precoded reference signals.

The first group of precoded reference signals and the second group of precoded reference signals are used by the terminal device to perform equivalent channel sounding.

In operation 220, the terminal device feeds back at least one piece of first indication information based on a transmission scheme that CSI feedback is based on.

In one embodiment, the terminal device may perform equivalent channel sounding based on a plurality of directions indicated by a plurality of precoded reference signals included in the first group of precoded reference signals and the second group of precoded reference signals, and use, based on the transmission scheme that the CSI feedback is based on, a precoding vector corresponding to a port with a relatively good current channel state selected from a plurality of ports corresponding to the plurality of precoded reference signals for data transmission.

It can be understood that, for different terminal devices, the determined precoding vectors for data transmission may be different depending on a current position of the terminal device, a motion state of the terminal device, an obstacle between the terminal device and the network device, and other factors. In this embodiment of this application, only one terminal is used as an example for detailed description. However, this should not constitute any limitation on this application. The terminal device may be any terminal device communicatively connected to the network device, and this is not limited in this application.

It should be noted that, the transmission scheme that the CSI feedback is based on (or referred to as the transmission scheme that the CSI measurement is based on) in this application is a transmission scheme based on which the terminal device is instructed to perform measurement and feedback, and can be understood as a feedback type (feedback type). The transmission scheme that the CSI feedback is based on and the transmission scheme for data transmission may be a same transmission scheme, or different transmission schemes. This is not limited in this application.

It should be understood that the transmission scheme that the CSI feedback is based on may be understood as an assumption of a transmission scheme, and the terminal device performs CSI measurement and feedback based on the assumed transmission scheme.

In one embodiment of this application, the transmission scheme for data transmission may be a diversity transmission scheme based on polarization directions. In the diversity transmission scheme based on polarization directions, signals may be processed by using precoding vectors corresponding to different polarization directions to obtain a space diversity gain. As an example rather than limitation, the data transmission scheme includes: a diversity transmission scheme, such as a space-time transmit diversity (STTD) (or referred to as space time block coding (STBC)), a space-frequency transmit diversity (SFTD) (or referred to as space frequency block coding (SFBC)), a cyclic delay diversity (CDD) (for example, a small delay-CDD (SD-CDD), a large delay-CDD (LD-CDD)), CDD based space division multiplexing, polarization based precoder cycling, a precoder cycling based space-time transmit diversity, a precoder cycling based space-frequency transmit diversity, a precoder cycling based CDD, or a combination of the foregoing transmission schemes.

The precoder cycling may be performed based on a precoder cycling granularity (or referred to as a precoder cycling size), and the precoder cycling granularity may be understood as a size of a corresponding resource for precoding by continuously using a same precoding vector (or precoding matrix). As an example rather than limitation, the precoder cycling granularity may be: one or more resource elements (resource element, RE), one or more resource units, or one or more subbands. A resource unit may be one or more resource blocks (RB) defined in an LTE protocol, or may be one or more resource block groups (RBG), and may further be a resource size defined in a future protocol to represent a scheduling unit. This is not limited in this application. Because the terminal device learns of the transmission scheme in advance, a quantity of precoding vectors required by the network device to transmit data based on this transmission scheme can be determined, so that the first indication information fed back to the network device can be determined. For example, for an STTD or SFTD transmission scheme, the network device needs to respectively precode two data layers by using two precoding vectors. For a transmission scheme such as an SD-CDD or polarization based precoder cycling, the network device needs at least two precoding vectors to precode a data layer, or at least two precoding matrices to precode a plurality of data layers.

In one embodiment of this application, because the transmission scheme that the CSI feedback is based on may be negotiated by the network device and the terminal device in advance, the terminal device may learn of, in advance, the transmission scheme that the CSI feedback is based on. The transmission scheme that the CSI feedback is based on may further be determined by the network device in advance and notified to the terminal device by using signaling.

In one embodiment, before operation 220, the method 200 further includes operation 230: The network device sends second indication information, where the second indication information indicates the transmission scheme that the CSI feedback is based on.

In one embodiment, the second indication information is set in CSI reporting setting information. Specifically, the transmission scheme may be indicated by an indication domain in the CSI reporting setting information. For example, the indication domain used to indicate the transmission scheme may be an indication domain of a feedback type.

Further, in one embodiment, the CSI reporting setting information may be carried in any one of the following messages:

a radio resource control (RRC) message, a media access control (MAC) control element (CE) or downlink control information (DCI).

Because the transmission schemes are different, the method for performing, by the terminal device, channel sounding based on the first group of precoded reference signals and the second group of precoded reference signals may also be different. A specific process in which the terminal device performs equivalent channel sounding based on the first group of precoded reference signals and the second group of precoded reference signals is described hereinafter with reference to several different transmission schemes.

After performing equivalent channel sounding, the terminal device may feed back the first indication information to the network device, so that the network device determines the plurality of precoding vectors for data transmission.

In one embodiment, the first indication information is a PMI, and the network device and the terminal device may pre-store one-to-one correspondences between a plurality of PMIs and a plurality of matrices. Each PMI is used to indicate one matrix, and each matrix is used to determine at least one precoding vector.

In one embodiment, the one-to-one correspondences between the plurality of PMIs and the plurality of matrices may be predefined (for example, defined by a protocol), preset and stored in the terminal device and the network device, or may be predefined by the network device and notified to the terminal device by using signaling, and the terminal device stores the one-to-one correspondences between the plurality of PMIs and the plurality of matrices.

In one embodiment of this application, the method in which the terminal device feeds back the PMI to the network device may include any one of the following methods:

Method 1: The terminal device feeds back one PMI to the network device, and the PMI can be used to determine a plurality of precoding vectors; and Method 2: The terminal device feeds back two PMIs to the network device, and each of the two PMIs can be used to determine one precoding matrix.

Method 1 and Method 2 are described in detail hereinafter with reference to specific transmission schemes.

In operation 240, the network device determines a plurality of precoding vectors based on the at least one piece of first indication information.

In one embodiment, the method 200 further includes operation 250: The network device precodes to-be-sent data based on the plurality of precoding vectors, and sends precoded data.

In one embodiment, the network device may directly precode the to-be-sent data based on the plurality of precoding vectors determined in operation 240, or may perform mathematical transformation or mathematical calculation based on the plurality of precoding vectors determined in operation 240 to obtain a plurality of precoding vectors for a precoding operation, and precode the to-be-sent data based on the plurality of precoding vectors. After precoding the data, the network device obtains and sends the precoded data.

It should be understood that the mathematical transformation or mathematical calculation in which the network device determines, based on the plurality of precoding vectors fed back by the terminal device, the plurality of precoding vectors for precoding may be the same as a specific method in the prior art. For brevity, detailed description of the process is omitted herein.

Method 1 and Method 2 are described below in detail with reference to step 230 and step 240, and several different transmission schemes.

In the following embodiment, it is assumed that a channel matrix corresponding to the first group of precoded reference signals is $H_1$, and corresponds to a first polarization direction, and a channel matrix corresponding to the second group of precoded reference signals is $H_2$, and corresponds to a second polarization direction. A precoding vector corresponding to a jth port in an ith polarization direction is $P_{i,j}$, where a value of i is 1 or 2, a value of j is a natural number in [1, J], and J represents a quantity of ports in the ith polarization direction. An equivalent channel vector corresponding to the jth port in the ith polarization direction is $h_{i,j}=H_i P_{i,j}$. The terminal device measures the equivalent channel vector $h_{i,j}$ corresponding to each port.

No matter which transmission scheme is used, the terminal device needs to measure channel quality to obtain ports (for ease of description, may be denoted as an mth port in the first polarization direction and an nth port in the second polarization direction) of a particular RI in different polarization directions. Precoding vectors corresponding to the two ports can enable channel quality obtained by calculation on a particular subcarrier to be optimal. m and n may be the same or different, and this is not limited in this application.

Transmission Scheme 1: Space-Frequency Transmit Diversity or Space-Time Transmit Diversity In the transmission scheme 1, the network device obtains two data layers after performing a transmit diversity operation on one data layer, the two data layers correspond to two ports, and two independent precoding vectors are needed to respectively precode the two data layers. After learning of the transmission scheme, the terminal device can perform equivalent channel sounding based on the transmission scheme and the received first group of precoded reference signals and second group of precoded reference signals.

The terminal device may traverse ports included in the polarization directions based on the transmission scheme 1, and determine an equivalent channel vector corresponding to each data layer under a particular optimization criterion, that is, $h_{1,m}$ and $h_{2,n}$. Therefore, the equivalent channel matrix applicable to the transmission scheme 1 may be denoted as:

$$h_{\it{eff}} = \begin{bmatrix} h_{1,m} & h_{2,n} \\ h_{2,n}^* & -h_{1,m}^* \end{bmatrix},$$

where $h_{1,m}$ represents an equivalent channel vector of an mth port on a first subcarrier or on a first time unit (for example, an OFDM symbol (referred to as a symbol for short below)), $h_{2,n}$ represents an equivalent channel vector of an nth port on the first subcarrier or on the first time unit, $-h_{1,m}^*$ represents an equivalent channel vector of an mth port on a second subcarrier or on a second time unit, $h_{2,n}^*$ represents an equivalent channel vector of an nth port on the second subcarrier or on the second time unit, and h* represents a conjugate of h. Therefore, the two corresponding precoding vectors can be determined, and are assumed to be $P_{1,m}$ and $P_{2,n}$.

$h_{1,m}$ and $h_{2,n}$ in the first row herein are equivalent channels measured on the first subcarrier or on the first time unit, and $h_{1,m}$ and $h_{2,n}$ in the second row are equivalent channels measured on the second subcarrier or on the second time unit. Slight differences may exist, but this application illustrates the equivalent channel matrix merely for ease of understanding and description, and should not constitute any limitation on this application.

It should be noted that the precoding vectors used on a same data layer, different subcarriers or different time units in the transmission scheme 1 may be the same. Therefore, the terminal device may determine only two precoding vectors, and feed back the two precoding vectors to the network device by using either Method 1 or Method 2. Alternatively, the network device may determine the two precoding vectors based on different feedback mechanisms and the received PMI.

Method 1:

The terminal device may feed back one PMI to the network device by using a joint feedback method. The PMI indicates a first matrix, and one column vector in the first matrix is used to indicate two precoding vectors in a plurality of precoding vectors. One of the two precoding vectors corresponds to a first polarization direction, and the other one of the two precoding vectors corresponds to a second polarization direction.

In one embodiment, the PMI may be the same as a PMI in the prior art. In the transmission scheme 1, the PMI may be used to indicate a column vector (it can be understood that because only two precoding vectors respectively corresponding to the two polarization directions need to be fed back in the transmission scheme 1, the column vector that needs to be fed back corresponds to a case in which the rank is 1), and the column vector is a column of the first matrix indicated by the PMI.

According to the foregoing description, it can be deduced that the PMI fed back by the terminal device includes an index, and the index may indicate a column vector as follows:

$$\frac{1}{\sqrt{2}} \begin{bmatrix} e_m^{(4)} \\ \alpha e_n^{(4)} \end{bmatrix}.$$

The network device may determine the column vector in a codebook based on the received PMI. It is assumed that a precoding vector used by a port corresponding to the column vector is:

$$\begin{bmatrix} P_{1,m} \\ \alpha P_{2,n} \end{bmatrix},$$

where

α is a polarization antenna phase factor, $P_{1,m}$ represents a precoding vector corresponding to an mth port in the first polarization direction, and $P_{2,n}$ represents a precoding vector corresponding to an nth port in the second polarization direction. It should be noted that a value of the polarization antenna phase factor in the matrix indicated by the PMI and a value of the polarization antenna phase factor in the precoding matrix indicated by the matrix are usually the same. For example, the value may be 1, −1, j or −j, but this is not limited in this application.

The network device may divide, based on the transmission scheme 1, the precoding vector indicated by the column vector into two precoding vectors as follows:

$$\begin{bmatrix} P_{1,m} \\ 0 \end{bmatrix} \text{ and } \begin{bmatrix} 0 \\ P_{2,n} \end{bmatrix}; \text{ or } \begin{bmatrix} P_{1,m} \\ 0 \end{bmatrix} \text{ and } \begin{bmatrix} 0 \\ \alpha P_{2,n} \end{bmatrix}.$$

$$\begin{bmatrix} P_{1,m} \\ 0 \end{bmatrix}$$

is a precoding vector corresponding to the first polarization direction, and has a value of 0 in the second polarization direction.

$$\begin{bmatrix} 0 \\ P_{2,n} \end{bmatrix} \text{ or } \begin{bmatrix} 0 \\ \alpha P_{2,n} \end{bmatrix}$$

is a precoding vector corresponding to the second polarization direction, and has a value of 0 in the first polarization direction. That is, a value of the precoding vector in one of the two polarization directions is 0, and only the other polarization direction is considered. The two precoding vectors are independent of each other. In other words, the two polarization directions corresponding to the two precoding vectors are independent of each other.

Based on the above, the network device may determine, based on the PMI fed back by the terminal device, two precoding vectors used for the transmission scheme 1. It can be seen that whether the polarization antenna phase factor $\alpha$ needs to be added after the foregoing precoding vector is divided into the precoding vectors respectively corresponding to the two polarization directions may be determined by the network device. However, the two precoding vectors are independent of each other regardless of whether the polarization antenna phase factor $\alpha$ is added.

Method 2:

The terminal device may feed back two PMIs to the network device by using an independent feedback method. Each PMI indicates one second matrix, one of two second matrices indicated by the two PMIs is used to indicate a group of precoding vectors corresponding to the first polarization direction, and the other one of the two second matrices is used to indicate a group of precoding vectors corresponding to the second polarization direction.

In one embodiment, in the transmission scheme 1, two PMIs may be used to respectively indicate two column vectors (that is, a column in the second matrix), and each column vector indicates one precoding vector.

According to the foregoing description, it can be deduced that each of the PMIs fed back by the terminal device includes one index, and each index may indicate one column vector. Column vectors indicated by the two PMIs may be shown, for example, as the following formulas:

$$\frac{1}{\sqrt{2}}\begin{bmatrix} e_m^{(4)} \\ 0 \end{bmatrix} \text{ and } \frac{1}{\sqrt{2}}\begin{bmatrix} 0 \\ e_n^{(4)} \end{bmatrix}; \text{ or } \frac{1}{\sqrt{2}}\begin{bmatrix} e_m^{(4)} \\ 0 \end{bmatrix} \text{ and } \frac{1}{\sqrt{2}}\begin{bmatrix} 0 \\ \alpha e_n^{(4)} \end{bmatrix};$$

or the foregoing formulas may be respectively represented as:

$$\frac{1}{\sqrt{2}}[e_m^{(4)}] \text{ and } \frac{1}{\sqrt{2}}[e_n^{(4)}]; \text{ or } \frac{1}{\sqrt{2}}[e_m^{(4)}] \text{ and } \frac{1}{\sqrt{2}}[\alpha e_n^{(4)}].$$

The network device may determine the two column vectors in a codebook based on the two received PMIs (it should be understood that the two PMIs may be any group of the four groups of column vectors listed above). It is assumed that precoding vectors used by ports corresponding to the two column vectors are respectively:

$$\begin{bmatrix} P_{1,m} \\ 0 \end{bmatrix} \text{ and } \begin{bmatrix} 0 \\ P_{2,n} \end{bmatrix}; \text{ or } \begin{bmatrix} P_{1,m} \\ 0 \end{bmatrix} \text{ and } \begin{bmatrix} 0 \\ \alpha P_{2,n} \end{bmatrix}.$$

It should be understood that although the foregoing precoding vectors can be independently fed back by using the two PMIs, the precoding vectors can still be described based on the two polarization directions.

Based on the above, the network device may determine, based on the transmission scheme 1 and the two received PMIs, two precoding vectors used for the transmission scheme 1. It can be seen that the two precoding vectors respectively correspond to the two polarization directions, and whether the polarization antenna phase factor $\alpha$ needs to be added may be determined by the network device. However, the two precoding vectors are independent of each other regardless of whether the polarization antenna phase factor $\alpha$ is added.

It should be noted that the precoding vectors fed back by the terminal device may correspond to ports configured by the network device. In this case, one of the plurality of precoding vectors may correspond to one precoded reference signal in the first group of precoded reference signals, and another one of the plurality of precoding vectors may correspond to another precoded reference signal in the second group of precoded reference signals. For details, refer to the foregoing description.

The precoding vectors fed back by the terminal device may be a combination (combining) of a plurality of ports configured by the network device. In this case, one of the plurality of precoding vectors may correspond to a plurality of precoded reference signals in the first group of precoded reference signals, and another one of the plurality of precoding vectors may correspond to a plurality of precoded reference signals in the second group of precoded reference signals. In this case, the terminal device may combine a plurality of ports linearly, and feed back the combined ports and a linear combination coefficient to the network device, so that the network device determines precoding vectors for data transmission.

It should be understood that a method used by the terminal device to combine the ports may be the same as a method in the prior art. For brevity, detailed description of a specific process is omitted herein.

It should further be understood that the terminal device can obtain only one of the two precoding vectors in a port combination manner, and the other one of the two precoding vectors may directly correspond to a particular port. This is not limited in this application.

Transmission Scheme 2: Cyclic Delay Diversity

In the transmission scheme 2, the network device may precode each data layer by using at least two precoding vectors. Specifically, the cyclic delay diversity is used during OFDM transmission, a cyclic configuration of a time domain signal is equivalent to a frequency-based phase offset before OFDM modulation. Therefore, the network device may precode each data layer on each subcarrier by using at least two independent precoding vectors.

If a rank is 1, the network device needs to determine at least two precoding vectors on one subcarrier based on the feedback from the terminal device; and if the rank is greater than 1, the network device needs to determine at least two precoding matrices on one subcarrier based on the feedback from the terminal device.

Based on the transmission scheme 2, the terminal device may traverse, on each subcarrier, ports included in all polarization directions, and notify, by using a PMI based on channel quality obtained by measurement and a criterion for optimal channel quality, the network device of a port corresponding to an equivalent channel with best performance in each polarization direction. That is, the terminal device needs to obtain at least two independent equivalent channels by measurement, at least one of the at least two independent equivalent channels corresponds to the first polarization direction, and at least one of the at least two independent equivalent channels corresponds to the second polarization direction.

For ease of description, assuming that the terminal device may determine two precoding vectors or precoding matrices on one subcarrier, the two precoding vectors or precoding matrices respectively correspond to the first polarization direction and the second polarization direction, and the terminal device needs to determine, by measurement and calculation, two independent equivalent channels $h_{1,m}$ and $h_{2,n}$. The two equivalent channels are respectively denoted as:

$$h_{1,m} = H_{1,k} P_{1,m}, \text{ and}$$

$$h_{2,n} = H_{2,k} P_{2,n}.$$

k represents a kth subcarrier, $H_{1,k}$ represents a channel matrix on the kth subcarrier in the first polarization direction, $H_{2,k}$ represents a channel matrix on the kth subcarrier in the second polarization direction, $P_{1,m}$ represents a precoding vector of an mth port in the first polarization direction, and $P_{2,n}$ represents a precoding vector of an nth port in the second polarization direction.

Assuming that the rank is 1, the channel matrix on the kth subcarrier may be denoted as:

$$h_{k,eff} = [H_{1,k} H_{2,k}][P_{1,m}{}^T b_k P_{2,n}{}^T]^T, \text{ where}$$

$b_k$ is a coefficient, and a value of $b_k$ may be determined by one of the network device or the terminal device, and notified to the other one. Alternatively, the value may be defined by a protocol, and this is not limited in this application. Based on the foregoing formula, it can be seen that a phase rotation (phase rotation) angle exists between the second polarization direction and the first polarization direction, and the phase rotation angle may change slowly as a value of k changes. Therefore, the network device needs to determine, based on the feedback from the terminal device, two precoding vectors $P_{1,m}$ and $P_{2,n}$ that change with the subcarrier, in other words, $h_{k,eff}$ that changes with the subcarrier.

The terminal device may separately traverse ports included in the polarization directions based on the transmission scheme 2, and determine, by calculation, a corresponding equivalent channel vector when optimal channel quality based on a particular measurement criterion on the kth subcarrier is optimal. In this way, the two corresponding precoding vectors may be determined, that is, $P_{1,m}$ and $P_{2,n}$.

After determining the two precoding vectors or precoding matrices based on the value of the rank, the transmission scheme 2, the first group of precoded reference signals and the second group of precoded reference signals, the terminal device may feed back the two precoding vectors or precoding matrices to the network device by using either of Method 1 and Method 2 below. Alternatively, the network device may determine the two precoding vectors or precoding matrices based on different feedback mechanisms and the received PMI.

A case in which the rank is 1 has been described in detail by using specific methods of feeding back the PMI by the terminal device based on the two precoding vectors and determining the two precoding vectors by the network device based on the PMI with reference to the foregoing transmission scheme 1. In the transmission scheme 2, the specific methods of feeding back the PMI by the terminal device based on the two precoding vectors and determining the two precoding vectors by the network device based on the PMI are the same as those in the transmission scheme 1. For brevity, they are not described herein again. A case in which the rank is greater than 1 is described herein with reference to Method 1 and Method 2.

Assuming that the rank is 2, the equivalent channel matrix may be denoted as:

$$h_{k,eff} = [H_{1,k} \quad H_{2,k}] \begin{bmatrix} P_{1,m} & P_{1,p} \\ b_{k1} P_{2,n} & b_{k2} P_{2,q} \end{bmatrix},$$

where a first column corresponds to a first data layer, and a second column corresponds to a second data layer, and m, n, p and q represent selected ports. That is, $$\begin{bmatrix} P_{1,m} \\ b_{k1} P_{2,n} \end{bmatrix} \text{ and } \begin{bmatrix} P_{1,p} \\ b_{k2} P_{2,q} \end{bmatrix}$$

are precoding vectors respectively corresponding to the two data layers, and constitute a precoding matrix with the rank of 2. A value of $b_{k1}$ and a value of $b_{k2}$ may be the same or different, and this is not limited in this application.

Method 1:

The terminal device may feed back one PMI to the network device by using a joint feedback method. The PMI indicates a first matrix, and one column vector in the first matrix is used to indicate two precoding vectors in a plurality of precoding vectors. One of the two precoding vectors corresponds to a first polarization direction, and the other one of the two precoding vectors corresponds to a second polarization direction.

In one embodiment, the PMI may be the same as a PMI in the prior art. In the transmission scheme 2, the PMI may be used to indicate one matrix (it can be understood that the two precoding matrices respectively corresponding to the two polarization directions need to be fed back when the rank is greater than 1), and the matrix is the another column of the first matrix indicated by the PMI.

According to the foregoing description, it can be deduced that the PMI fed back by the terminal device includes an index, and the index may indicate a matrix as follows:

$$\frac{1}{\sqrt{2}} \begin{bmatrix} e_m^{(4)} & e_p^{(4)} \\ \alpha e_n^{(4)} & \alpha e_q^{(4)} \end{bmatrix}.$$

A first column is used to determine one precoding vector $$\begin{bmatrix} P_{1,m} \\ \alpha b_{k1} P_{2,n} \end{bmatrix},$$

and a second column is used to determine the other precoding vector $$\begin{bmatrix} P_{1,p} \\ \alpha b_{k2} P_{2,q} \end{bmatrix}.$$

The network device may determine the matrix in a codebook based on the received PMI, and determine, based on the port corresponding to the matrix, that a precoding matrix is:

$$\begin{bmatrix} P_{1,m} & P_{1,p} \\ \alpha b_{k1}P_{2,n} & \alpha b_{k2}P_{2,q} \end{bmatrix},$$

and the network device may divide, based on the transmission scheme 2, the precoding matrix indicated by the matrix into two precoding matrices as follows:

$$\begin{bmatrix} P_{1,m} & P_{1,p} \\ 0 & 0 \end{bmatrix} \text{ and } \begin{bmatrix} 0 & 0 \\ \alpha b_{k1}P_{2,n} & \alpha b_{k2}P_{2,q} \end{bmatrix}; \text{ or } \begin{bmatrix} P_{1,m} & P_{1,p} \\ 0 & 0 \end{bmatrix} \text{ and }$$
$$\begin{bmatrix} 0 & 0 \\ b_{k1}P_{2,n} & b_{k2}P_{2,q} \end{bmatrix}, \begin{bmatrix} P_{1,m} & P_{1,p} \\ 0 & 0 \end{bmatrix}$$

is a precoding matrix corresponding to the first polarization direction, and $$\begin{bmatrix} 0 & 0 \\ \alpha b_{k1}P_{2,n} & \alpha b_{k2}P_{2,q} \end{bmatrix} \text{ or } \begin{bmatrix} 0 & 0 \\ b_{k1}P_{2,n} & b_{k2}P_{2,q} \end{bmatrix}$$

is a precoding matrix corresponding to the second polarization direction. Based on the above, the network device may determine, based on the PMI fed back by the terminal device, two precoding matrices used for the transmission scheme 2. It can be seen that the two precoding matrices respectively correspond to the two polarization directions, and whether the polarization antenna phase factor α needs to be added may be determined by the network device. However, the two precoding matrices are independent of each other regardless of whether the polarization antenna phase factor α is added.

Method 2:

The terminal device may feed back two PMIs to the network device by using an independent feedback method. Each PMI indicates one second matrix, one of two second matrices indicated by the two PMIs is used to indicate a group of precoding vectors corresponding to the first polarization direction, and the other one of the two second matrices is used to indicate a group of precoding vectors corresponding to the second polarization direction.

In one embodiment, in the transmission scheme 2, two PMIs may be used to indicate two matrices (that is, a column in the second matrix), and the column vector in each matrix indicates one precoding vector, and each matrix indicates one precoding matrix.

According to the foregoing description, it can be deduced that each of the PMIs fed back by the terminal device includes one index, and each index may indicate one matrix. Matrices indicated by the two PMIs (in other words, two groups of column vectors) may be shown, for example, as the following formulas:

$$\frac{1}{\sqrt{2}}\begin{bmatrix} e_m^{(4)} & e_p^{(4)} \\ 0 & 0 \end{bmatrix} \text{ and } \frac{1}{\sqrt{2}}\begin{bmatrix} 0 & 0 \\ e_n^{(4)} & e_q^{(4)} \end{bmatrix}; \text{ or } \frac{1}{\sqrt{2}}\begin{bmatrix} e_m^{(4)} & e_p^{(4)} \\ 0 & 0 \end{bmatrix} \text{ and }$$
$$\frac{1}{\sqrt{2}}\begin{bmatrix} 0 & 0 \\ \alpha e_n^{(4)} & \alpha e_q^{(4)} \end{bmatrix}.$$

The network device may determine the two matrices in a codebook based on the received two PMIs. It is assumed that precoding vectors used by ports corresponding to column vectors in the two matrices are respectively:

$$\begin{bmatrix} P_{1,m} \\ 0 \end{bmatrix}, \begin{bmatrix} P_{1,p} \\ 0 \end{bmatrix}, \begin{bmatrix} 0 \\ b_{k1}P_{2,n} \end{bmatrix} \text{ and } \begin{bmatrix} 0 \\ b_{k2}P_{2,q} \end{bmatrix}; \text{ or } \begin{bmatrix} P_{1,m} \\ 0 \end{bmatrix}, \begin{bmatrix} P_{1,p} \\ 0 \end{bmatrix},$$
$$\begin{bmatrix} 0 \\ \alpha b_{k1}P_{2,n} \end{bmatrix} \text{ and } \begin{bmatrix} 0 \\ \alpha b_{k2}P_{2,q} \end{bmatrix}.$$
$$\begin{bmatrix} P_{1,m} \\ 0 \end{bmatrix} \text{ and } \begin{bmatrix} P_{1,p} \\ 0 \end{bmatrix}$$

are one group of precoding vectors corresponding to the first polarization direction, and can be combined into a precoding matrix $$\begin{bmatrix} P_{1,m} & P_{1,p} \\ 0 & 0 \end{bmatrix}, \begin{bmatrix} 0 \\ b_{k1}P_{2,n} \end{bmatrix} \text{ and } \begin{bmatrix} 0 \\ b_{k2}P_{2,q} \end{bmatrix}.$$

Alternatively, $$\begin{bmatrix} 0 \\ \alpha b_{k1}P_{2,n} \end{bmatrix} \text{ and } \begin{bmatrix} 0 \\ \alpha b_{k2}P_{2,q} \end{bmatrix}$$

are one group of precoding vectors corresponding to the second polarization direction, and can be combined into a precoding matrix $$\begin{bmatrix} 0 & 0 \\ b_{k1}P_{2,n} & b_{k2}P_{2,q} \end{bmatrix} \text{ or } \begin{bmatrix} 0 & 0 \\ \alpha b_{k1}P_{2,n} & \alpha b_{k2}P_{2,q} \end{bmatrix}.$$

Based on the above, the network device may determine, based on the transmission scheme 2 and the two received PMIs, two precoding matrices used for the transmission scheme 2.

It should be noted that the ports determined by the terminal device may be ports configured by the network device. In this case, one of the plurality of precoding matrices may correspond to one precoded reference signal in the first group of precoded reference signals, and another one of the plurality of precoding matrices may correspond to another precoded reference signal in the second group of precoded reference signals. For details, refer to the foregoing description.

The terminal device may further combine (combining) ports configured by the network device. In this case, precoding vectors included in one of the plurality of precoding matrices may include at least one precoding vector corresponding to a plurality of precoded reference signals in the first group of precoded reference signals, and precoding vectors included in another one of the plurality of precoding matrices may include at least one precoding vector corresponding to a plurality of precoded reference signals in the second group of precoded reference signals. In this case, the terminal device may combine two or more ports linearly, and feed back the combined ports and a linear combination coefficient to the network device, so that the network device determines precoding vectors for data transmission.

It should be understood that a method used by the terminal device to combine the ports may be the same as a method in the prior art. For brevity, detailed description of a specific process is omitted herein.

It should also be understood that a quantity of the precoding vectors, obtained by combining ports, in the plurality of precoding matrices is not limited in this application.

Transmission Scheme 3: Polarization Based Precoder Cycling

In the transmission scheme 3, the network device may precode each data layer by using at least two precoding vectors. Specifically, the polarization based precoder cycling may be understood as precoding, based on a precoder cycling granularity, data by alternately using a plurality of precoding vectors corresponding to different polarization directions.

If the rank is 1, the network device needs to determine at least two precoding vectors based on the feedback from the terminal device; and if the rank is greater than 1, the network device needs to determine at least two precoding matrices based on the feedback from the terminal device. Therefore, the terminal device can notify, by using a PMI based on a channel quality obtained by measurement and a criterion for optimal channel quality, the network device of a port corresponding to an equivalent channel with best performance in each polarization direction.

For ease of description, assuming that the terminal device determines two precoding vectors or precoding matrices, the terminal device needs to obtain two independent equivalent channels $h_{1,m}$ and $h_{2,n}$ by measurement, at least one of the two independent equivalent channels corresponds to the first polarization direction, and the other one of the two independent equivalent channels corresponds to the second polarization direction.

Based on the transmission scheme 3, the terminal device may separately traverse ports included in the polarization directions, and determine, by calculation, at least two corresponding equivalent channel vectors (corresponding to a case in which the rank is 1) or equivalent channel matrices (corresponding to a case in which the rank is greater than 1) under a particular optimization criterion. Therefore, the at least two corresponding equivalent channel vectors (corresponding to the case in which the rank is 1) or equivalent channel matrices (corresponding to the case in which the rank is greater than 1) can be determined, and are assumed to be $W_{1,m}$ and $W_{2,n}$. It can be understood that when the rank is 1, $W_{1,m}$ and $W_{2,n}$ are both precoding vectors, and when the rank is greater than 1, $W_{1,m}$ and $W_{2,n}$ are precoding matrices.

It is assumed that the two independent equivalent channels $h_{1,m}$ and $h_{2,n}$ measured by the terminal device are respectively:

$h_{\textit{eff}} = h_{1,m} = [H_1 H_2][W_{1,m}^T 0^T]^T$, and $h_{\textit{eff}} = h_{2,n} = [H_1 H_2][0^T W_{2,n}^T]^T$.

After determining at least two precoding vectors or precoding matrices based on the value of the rank, the transmission scheme 3, the first group of precoded reference signals and the second group of precoded reference signals, the terminal device may feed back the at least two precoding vectors or precoding matrices to the network device by using either of Method 1 and Method 2 below. Alternatively, the network device may determine the at least two precoding vectors or precoding matrices based on different feedback mechanisms and the received PMI.

Method 1:

The terminal device may feed back one PMI to the network device by using a joint feedback method. The PMI indicates a first matrix, and one column vector in the first matrix is used to indicate two precoding vectors in a plurality of precoding vectors. One of the two precoding vectors corresponds to a first polarization direction, and the other one of the two precoding vectors corresponds to a second polarization direction.

Method 2:

The terminal device may feed back two PMIs to the network device by using an independent feedback method. Each PMI indicates one second matrix, one of two second matrices indicated by the two PMIs is used to indicate a group of precoding vectors corresponding to the first polarization direction, and the other one of the two second matrices is used to indicate a group of precoding vectors corresponding to the second polarization direction.

It should be understood that the joint feedback manner or independent feedback manner used by the terminal device to feed back the PMI to the network device in the transmission scheme 3 is the same as the specific method for feeding back the PMI by the terminal device in the transmission scheme 2, and a specific method for determining, by the network device, the plurality of precoding vectors or precoding matrices based on the received PMIs is the same as the specific method for determining, by the network device, the plurality of precoding vectors or precoding matrices based on the received PMIs in the transmission scheme 2. For brevity, detailed description of its specific process is omitted herein.

It should further be understood that the foregoing description with reference to the transmission scheme 2 and the transmission scheme 3 is provided merely by using an example of feeding back two precoding vectors or two precoding matrices, but this should not constitute any limitation on this application. When feeding back more than two precoding vectors or precoding matrices, the terminal device may obtain more than one precoding vector or precoding matrix by separately measuring in different polarization directions.

It should also be understood that Method 1 and Method 2 are described in detail with reference to three diversity transmission schemes of different types. However, this should not constitute any limitation on this application, and the terminal device may further feed back a PMI for precoder cycling. For example, in a transmission scheme of a precoder cycling based space-time transmit diversity or a precoder cycling based space-frequency transmit diversity, the terminal device may first feed back a PMI for a space-time transmit diversity or a space-frequency transmit diversity, and further feeds back a PMI for precoder cycling. Transmission schemes applied to Method 1 and Method 2 are not limited in this application.

Therefore, in one embodiment of this application, the terminal device performs channel sounding based on the transmission scheme and the two groups of precoded reference signals of different polarization directions, and indicates, to the network device, the plurality of precoding vectors for data transmission, where the plurality of precoding vectors can satisfy requirements of a plurality of precoding vectors during diversity transmission. In this way, the network device can use different precoding vectors for ports in different polarization directions to precode data and implement a diversity gain to the greatest extent, helping improve data transmission reliability and thereby improving robustness of a communications system.

The data transmission method according to an embodiment of this application is described in detail above with reference to FIG. 3 and FIG. 4, and a data transmission method according to another embodiment of this application is described in detail below with reference to FIG. 5.

Figure 5:
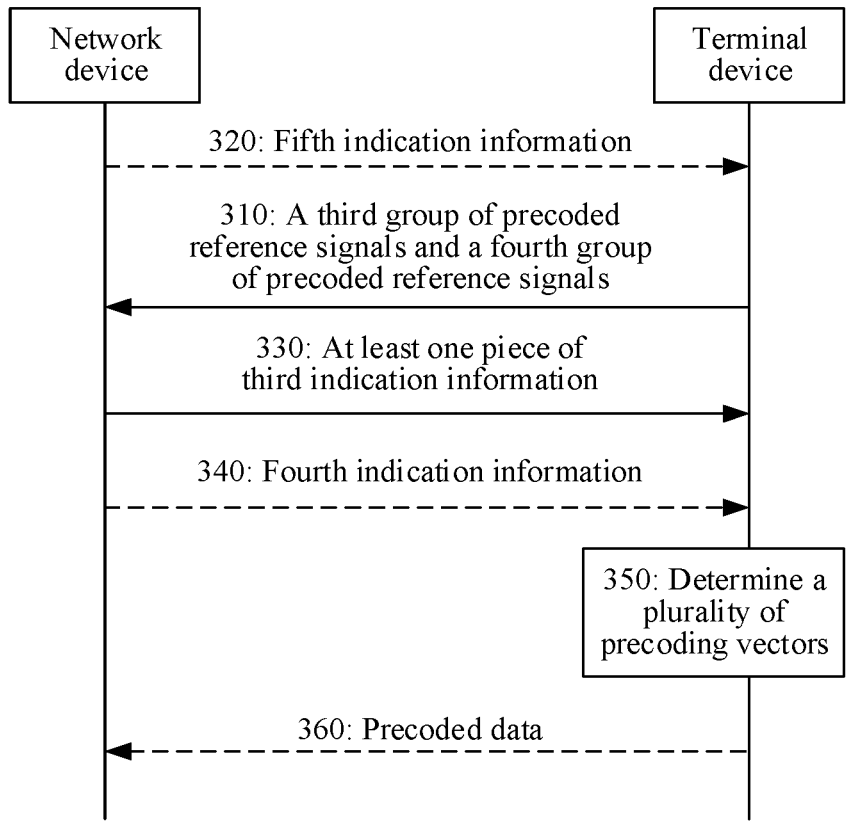
FIG. 5 is a schematic flowchart of a data transmission method according to another embodiment of this application.

FIG. 5 is a schematic flowchart, from a device interaction perspective, of a data transmission method 300 according to another embodiment of this application. FIG. 5 shows an uplink data transmission scenario. As shown in the figure, the method 300 shown in FIG. 5 may include operation 310 to operation 360.

In operation 310, a terminal device sends a third group of precoded reference signals and a fourth group of precoded reference signals.

Correspondingly, in operation 310, a network device receives the third group of precoded reference signals and the fourth group of precoded reference signals.

In one embodiment, before operation 310, the method 300 further includes operation 320: the network device sends fifth indication information, where the fifth indication information is used to instruct the terminal device to send a plurality of groups of precoded reference signals.

In one embodiment, the third group of precoded reference signals corresponds to a first polarization direction, and the fourth group of precoded reference signals corresponds to a second polarization direction.

In operation 330, the network device sends at least one piece of third indication information based on a transmission scheme that CSI measurement is based on.

In one embodiment, the at least one piece of third indication information is used to determine the plurality of precoding vectors. At least one of the plurality of precoding vectors corresponds to at least one precoded reference signal in the third group of precoded reference signals, and at least one of the plurality of precoding vectors corresponds to at least one precoded reference signal in the fourth group of precoded reference signals.

As an example rather than limitation, the transmission scheme that the CSI measurement is based on includes: a diversity transmission scheme, such as an STTD (or referred to as an STBC), an SFTD (or referred to as an SFBC), a CDD (for example, including an SD-CDD) and an LD-CDD), CDD based space division multiplexing, polarization based precoder cycling, a precoder cycling based space-time transmit diversity, a precoder cycling based space-frequency transmit diversity, a precoder cycling based CDD, or a combination of the foregoing transmission schemes.

It should be understood that the transmission scheme that the CSI measurement is based on may be understood as an assumption of a transmission scheme, and the network device performs CSI measurement and indicates based on the assumed transmission scheme.

In one embodiment of this application, the network device may measure and indicate, based on a particular transmission scheme, the at least one piece of third indication information used to determine the plurality of precoding vectors, or may measure and indicate, based on a plurality of transmission schemes, the at least one piece of third indication information that is used for a transmission scheme for uplink transmission and that is used to determine the plurality of precoding vectors.

If the network device performs measurement based on a specific transmission scheme, operation 330 specifically includes:

indicating, by the network device, the at least one piece of third indication information based on one transmission scheme.

The transmission scheme for uplink data transmission may be predefined (for example, defined by a protocol), and preset in the network device and the terminal device. The network device may perform measurement and indication based on the predefined transmission scheme. The terminal device may perform data transmission based on the predefined transmission scheme and the plurality of precoding vectors indicated by the network device. Compared with another scheme, this scheme can reduce measurement complexity.

If the network device performs measurement based on a plurality of transmission schemes, operation 330 includes:

indicating, by the network device, the at least one piece of third indication information based on the plurality of transmission schemes; and the method 300 further includes operation 340: The network device sends fourth indication information, where the fourth indication information indicates the transmission scheme for uplink data transmission.

As an example rather than limitation, the transmission scheme for uplink data transmission includes: a diversity transmission scheme, such as an STTD (or referred to as an STBC), an SFTD (or referred to as an SFBC), a CDD (for example, including an SD-CDD and an LD-CDD), CDD based space division multiplexing, polarization based precoder cycling, a precoder cycling based space-time transmit diversity, a precoder cycling based space-frequency transmit diversity, a precoder cycling based CDD, or a combination of the foregoing transmission schemes.

It may be understood that the transmission scheme that the CSI measurement is based on may be the same as or different from the transmission scheme for uplink data transmission.

In operation 350, the terminal device determines a plurality of precoding vectors based on the at least one piece of third indication information.

In one embodiment, the method 300 further includes operation 360: The terminal device precodes to-be-sent data based on the plurality of precoding vectors, and sends precoded data.

It should be understood that the foregoing third group of precoded reference signals and the foregoing fourth group of precoded reference signals, the foregoing third indication information and the foregoing fourth indication information are merely used to distinguish the first group of precoded reference signals, the second group of precoded reference signals, the first indication information and the second indication information in the method 200, and do not constitute any limitation on this application.

It should also be understood that the foregoing data transmission method 300 is applicable to uplink transmission, and may further be applicable to downlink transmission based on channel reciprocity. After performing channel sounding based on the reference signals sent by the terminal device for uplink channel sounding, the network device may determine CSI of a downlink channel by using the channel reciprocity, to derive a precoding matrix for downlink data transmission.

It should also be understood that specific processes of operations in the method 300 are similar to specific processes of operations in the method 200. For brevity, detailed descriptions of operations in the method 300 are omitted herein.

Therefore, in one embodiment of this application, the network device performs channel sounding based on the transmission scheme and the two groups of precoded reference signals of different polarization directions, and indicates, to the terminal device, the plurality of precoding vectors for data transmission, where the plurality of precoding vectors can satisfy requirements of a plurality of precoding vectors during diversity transmission. In this way, the terminal device can use different precoding vectors for ports in different polarization directions to precode data and obtain a diversity gain to the greatest extent, helping improve data transmission reliability and thereby improving robustness of a communications system.

It should be understood that in this application, merely for ease of description, the data transmission method of the embodiments of this application is described by using an example of diversity transmission based on polarization directions. However, the transmission scheme applicable to the data transmission method provided in this application is not limited to the diversity transmission based on polarization directions. For example, the sending end may send a plurality of precoded reference signals based on different antenna panels, to obtain CSI based on different antenna panels, or send a plurality of groups of precoded reference signals based on different groups (for example, grouped based on polarization directions or not based on polarization directions) of a same antenna panel, to obtain CSI of different groups.

It should further be understood that the groups based on polarization directions and the groups based on antenna panels that are listed above may be grouped based on antenna ports of a same network device (for example, a same TRP), or antenna ports from a same network device may be divided into one group. This is not limited in this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The data transmission method provided in the embodiments of this application is described in detail above with reference to FIG. 3 to FIG. 5. A network device and a terminal device provided in the embodiments of this application are described in detail below with reference to FIG. 6 to FIG. 9.

Figure 6:
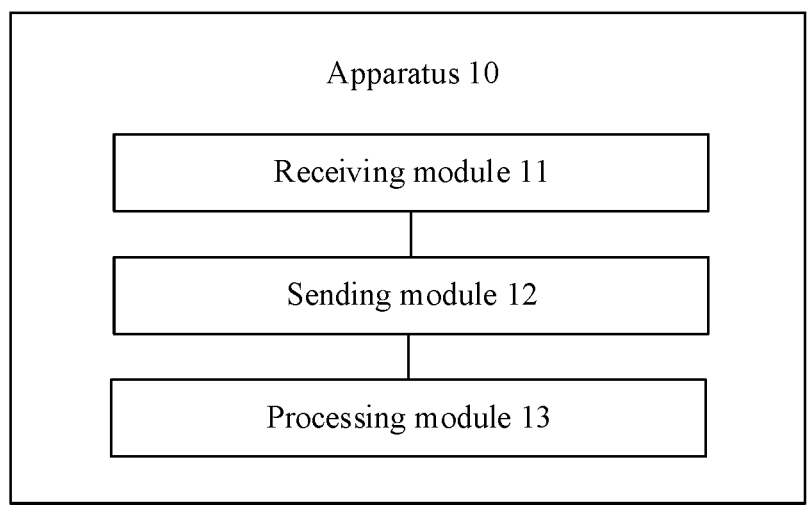
FIG. 6 is a schematic block diagram of an apparatus according to an embodiment of this application.

According to the foregoing method, FIG. 6 is a schematic block diagram of an apparatus 10 according to an embodiment of this application. As shown in FIG. 6, the apparatus 10 may be a terminal device, or may be a chip or a circuit, for example, a chip or circuit that can be disposed in a terminal device. The terminal device may correspond to the terminal device in the foregoing method.

In one embodiment, the apparatus 10 may include: a receiving module 11 and a sending module 12.

The receiving module 11 is configured to receive a first group of precoded reference signals and a second group of precoded reference signals, where the first group of precoded reference signals includes at least one precoded reference signal, and the second group of precoded reference signals includes at least one precoded reference signal.

The sending module 12 is configured to feed back at least one piece of first indication information based on a transmission scheme that CSI feedback is based on, where the at least one piece of first indication information is used to determine a plurality of precoding vectors, at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

In one embodiment, the transmission scheme that the CSI feedback is based on includes: a time-space transmit diversity, a time-frequency transmit diversity, a cyclic delay diversity or polarization based precoder cycling.

In one embodiment, the receiving module 11 is further configured to receive second indication information, and the second indication information indicates the transmission scheme that the CSI feedback is based on.

In one embodiment, the second indication information is set in CSI reporting setting information.

In one embodiment, the first group of precoded reference signals corresponds to a first polarization direction, and the second group of precoded reference signals corresponds to a second polarization direction.

In one embodiment, the first indication information is a PMI, the terminal device stores one-to-one correspondences between a plurality of PMIs and a plurality of matrices, and each matrix in the plurality of matrices is used to indicate at least one precoding vector.

In one embodiment, there is one PMI, the PMI indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals.

In one embodiment, there are two PMIs, the two PMIs have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors include the first group of precoding vectors and the second group of precoding vectors.

It should be understood that the apparatus 10 may correspond to the terminal device in the data transmission method 200 according to the embodiments of this application, and the apparatus 10 may include modules configured to perform a method performed by the terminal device configured to perform the data transmission method 200 in FIG. 4. In addition, the modules in the apparatus 10 and other foregoing operations and/or functions are separately used to implement a corresponding procedure of the data transmission method 200 in FIG. 4. In one embodiment, the receiving module 11 is configured to perform operation 210, operation 230 and operation 250 in the method 200, and the sending module 12 is configured to perform operation 220 in the method 200. A specific process of performing the corresponding operations by the modules is described in detail in the method 200. For brevity, details are not described herein again.

Alternatively, the apparatus 10 may include: a sending module 12, a receiving module 11, and a processing module 13.

The sending module is configured to send a third group of precoded reference signals and a fourth group of precoded reference signals, where the third group of precoded reference signals includes at least one precoded reference signal, and the fourth group of precoded reference signals includes at least one precoded reference signal.

The receiving module 11 is configured to receive at least one piece of third indication information, where the at least one piece of third indication information is related to a transmission scheme that CSI measurement is based on.

The processing module 13 is configured to determine a plurality of precoding vectors based on the at least one piece of third indication information, where at least one of the plurality of precoding vectors corresponds to the at least one precoded reference signal in the third group of precoded reference signals, and at least one of the plurality of precoding vectors corresponds to the at least one precoded reference signal in the fourth group of precoded reference signals.

In one embodiment, the transmission scheme that the CSI measurement is based on includes: a space-time transmit diversity (STTD), a space-frequency transmit diversity (SFTD), a cyclic delay diversity (CDD) or polarization based precoder cycling. The CDD includes an SD-CDD and an LD-CDD.

It should be understood that, the transmission schemes described above are merely for illustration purposes, and should not constitute any limitation on this application. The transmission scheme that the CSI measurement is based on may further include: a diversity transmission, such as CDD based space division multiplexing, a precoder cycling based space-time transmit diversity, a precoder cycling based space-frequency transmit diversity, or a precoder cycling based CDD, and a combination of the foregoing transmission schemes.

In one embodiment, the receiving module 11 is further configured to receive fourth indication information, and the fourth indication information indicates a transmission scheme for uplink data transmission.

In one embodiment, the fourth indication information is set in the CSI reporting setting information.

In one embodiment, the third group of precoded reference signals corresponds to the first polarization direction, and the fourth group of precoded reference signals corresponds to the second polarization direction.

In one embodiment, the third indication information is a PMI, the terminal device pre-stores one-to-one correspondences between a plurality of PMIs and a plurality of matrices, and each matrix in the plurality of matrices is used to indicate at least one precoding vector.

In one embodiment, there is one PMI, the PMI indicates a third matrix in the plurality of matrices, each column vector in the third matrix is used to indicate two precoding vectors in the plurality of precoding vectors, one of the two precoding vectors corresponds to at least one precoded reference signal in the third group of precoded reference signals, and the other one of the two precoding vectors corresponds to at least one precoded reference signal in the fourth group of precoded reference signals.

The processing module 13 is specifically configured to determine, based on the third matrix indicated by the PMI, the two precoding vectors indicated by each column vector in the third matrix.

In one embodiment, there are two PMIs, the two PMIs have a one-to-one correspondence with two fourth matrices in the plurality of matrices, each PMI indicates a fourth matrix, one of the two fourth matrices is used to indicate a third group of precoding vectors, the third group of precoding vectors corresponds to the at least one precoded reference signal in the third group of precoded reference signals, the other one of the two fourth matrices is used to indicate a fourth group of precoding vectors, the fourth group of precoding vectors corresponds to the at least one precoded reference signal in the fourth group of precoded reference signals, and the plurality of precoding vectors include the third group of precoding vectors and the fourth group of precoding vectors.

The processing module 13 is specifically configured to determine the third group of precoding vectors and the fourth group of precoding vectors based on the two fourth matrices indicated by the two PMIs.

In one embodiment, the receiving module 11 is further configured to receive fifth indication information, where the fifth indication information is used to instruct the apparatus 10 to send a plurality of groups of precoded reference signals.

It should be understood that the apparatus 10 may correspond to the terminal device in the data transmission method 300 according to the embodiments of this application, and the network device may include modules configured to perform a method performed by the terminal device configured to perform the data transmission method 300 in FIG. 5. In addition, the modules in the apparatus 10 and other foregoing operations and/or functions are separately used to implement a corresponding procedure of the data transmission method 300 in FIG. 5. Specifically, the sending module 11 is configured to perform operation 310 and operation 360 in the method 300, the receiving module 12 is configured to perform operation 320 to operation 340 in the method 300, and the processing module 13 is configured to perform operation 350 in the method 300. A specific process of performing the corresponding operations by the modules is described in detail in the method 300. For brevity, details are not described herein again.

Figure 7:
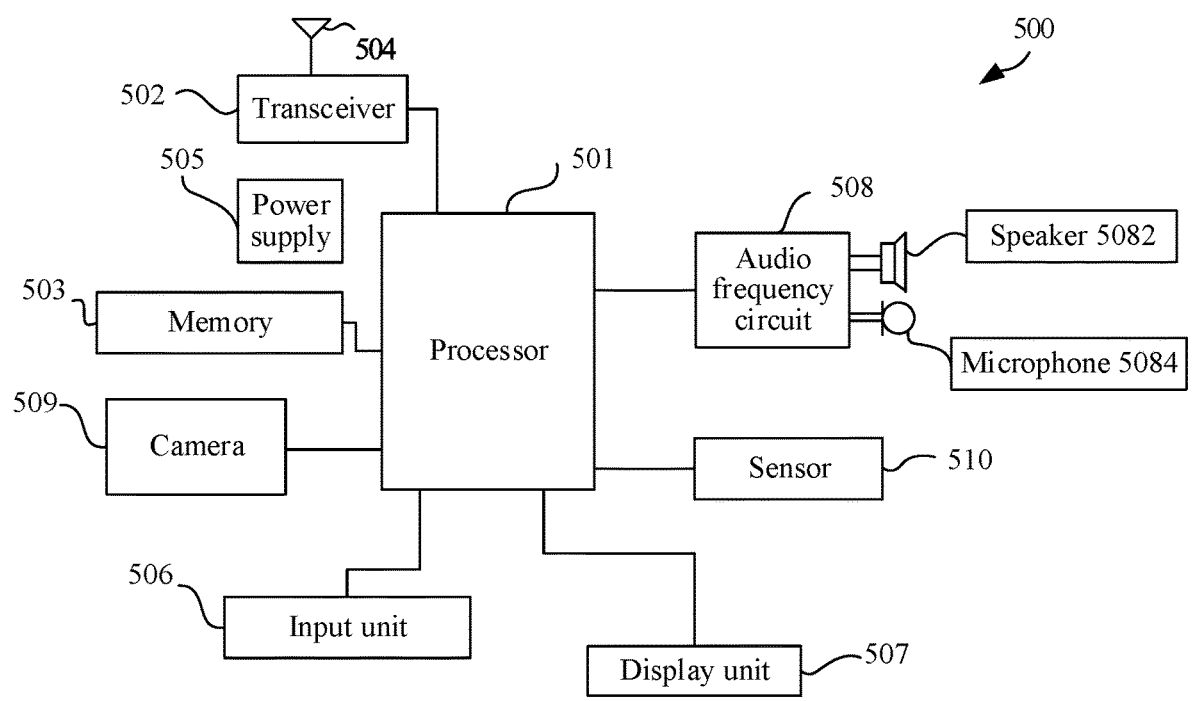
FIG. 7 is a schematic structural diagram of a terminal device according to this application.

FIG. 7 is a schematic structural diagram of a terminal device 500 according to an embodiment of this application. As shown in FIG. 7, the terminal device 500 includes a processor 501 and a transceiver 502. Optionally, the terminal device 500 further includes a memory 503. The processor 502, the transceiver 502 and the memory 503 communicate with each other by using internal connection channels, and transmit control and/or data signals. The memory 503 is configured to store a computer program, and the processor 501 is configured to: invoke and run the computer program from the memory 503 to control the transceiver 502 to receive and send a signal.

The foregoing processor 501 and the memory 503 may be integrated into one processing apparatus. The processor 501 is configured to execute program code stored in the memory 503, to implement the foregoing function. During specific implementation, the memory 503 may also be integrated in the processor 501, or independent of the processor 501. The terminal device 500 may further include an antenna 504, configured to send out, by using a radio signal, uplink data or uplink control signaling output by the transceiver 502.

In one embodiment, the terminal device 500 may correspond to the terminal device in the data transmission method 200 according to the embodiments of this application, and the terminal device 500 may include modules configured to perform a method performed by the terminal device configured to perform the data transmission method 200 in FIG. 4. In addition, the modules in the terminal device 500 and other foregoing operations and/or functions are separately used to implement a corresponding procedure of the data transmission method 200 in FIG. 4. Specifically, the memory 503 is configured to: store program code and enable the processor 501 to control, when executing the program code, the transceiver 502 to perform operation 210 to operation 230, and operation 250 in the method 200 by using an antenna 504 and perform operation 240. A specific process of performing the corresponding operations by the modules is described in detail in the method 200. For brevity, details are not described herein again.

Alternatively, the terminal device 500 may correspond to the terminal device in the data transmission method 300 according to the embodiments of this application, and the terminal device 500 may include modules configured to perform a method performed by the terminal device configured to perform the data transmission method 300 in FIG. 5. In addition, the modules in the terminal device 500 and other foregoing operations and/or functions are separately used to implement a corresponding procedure of the data transmission method 300 in FIG. 5. In one embodiment, the memory 503 is configured to: store program code and enable the processor 501 to control, when executing the program code, the transceiver 502 to perform operation 310 to operation 340, and operation 360 in the method 300 by using an antenna 504, and perform operation 350 in the method 300. A specific process of performing the corresponding operations by the modules is described in detail in the method 300. For brevity, details are not described herein again.

The foregoing processor 501 may be configured to perform an action that is described in the foregoing method embodiment and that is implemented inside the terminal, and the transceiver 502 may be configured to perform an action that is of transmitting or sending from the terminal to the network device and that is described in the foregoing method embodiment. For details, refer to the descriptions in the foregoing method embodiment, and details are not described herein again.

The foregoing processor 501 and the memory 503 may be integrated into one processing apparatus. The processor 501 is configured to execute program code stored in the memory 503, to implement the foregoing function. During specific implementation, the memory 503 may also be integrated in the processor 501.

The foregoing terminal device 500 may further include a power supply 505, configured to supply power to components or circuits in the terminal.

In one embodiment, the terminal device 500 may further include one or more of an input unit 506, a display unit 507, an audio frequency circuit 508, a camera 509, a sensor 510, and the like. The audio frequency circuit may further include a speaker 5082, a microphone 5084, and the like.

Figure 8:
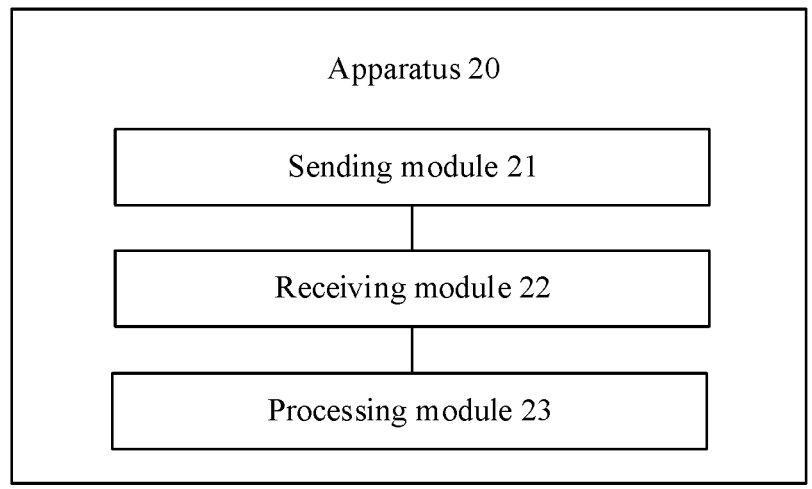
FIG. 8 is another schematic block diagram of an apparatus according to an embodiment of this application.

FIG. 8 is a schematic block diagram of an apparatus 20 according to an embodiment of this application. As shown in FIG. 8, the apparatus 20 may be a network device, or may be a chip or a circuit, for example, a chip or circuit that can be disposed in a network device. The apparatus 20 corresponds to the network device in the foregoing method.

In one embodiment, the apparatus 20 may include a sending module 21, a receiving module 22, and a processing module 23.

The sending module 21 is configured to send a first group of precoded reference signals and a second group of precoded reference signals, where the first group of precoded reference signals includes at least one precoded reference signal, and the second group of precoded reference signals includes at least one precoded reference signal.

The receiving module 22 is configured to receive at least one piece of first indication information, where the at least one piece of first indication information is related to a transmission scheme that CSI feedback is based on.

The processing module 23 is configured to determine a plurality of precoding vectors based on the at least one piece of first indication information, where at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

In one embodiment, the transmission scheme that the CSI feedback is based on includes: a time-space transmit diversity, a time-frequency transmit diversity, a cyclic delay diversity or polarization based precoder cycling.

In one embodiment, the sending module 21 is further configured to send second indication information, and the second indication information indicates the transmission scheme that the CSI feedback is based on.

In one embodiment, the second indication information is set in CSI reporting setting information.

In one embodiment, the first group of precoded reference signals corresponds to a first polarization direction, and the second group of precoded reference signals corresponds to a second polarization direction.

In one embodiment, the first indication information is a PMI, the terminal device pre-stores one-to-one correspondences between a plurality of PMIs and a plurality of matrices, and each matrix in the plurality of matrices is used to indicate at least one precoding vector.

In one embodiment, there is one PMI, the PMI indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals.

The processing module 23 is specifically configured to determine, based on the first matrix indicated by the PMI, the two precoding vectors indicated by each column vector in the first matrix.

In one embodiment, there are two PMIs, the two PMIs have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors include the first group of precoding vectors and the second group of precoding vectors.

The processing module 23 is specifically configured to determine the first group of precoding vectors and the second group of precoding vectors based on the two second matrices indicated by the two PMIs.

It should be understood that the apparatus 20 may correspond to the network device in the data transmission method 200 according to the embodiments of this application, and the apparatus 20 may include modules configured to perform a method performed by the network device configured to perform the data transmission method 200 in FIG. 4. In addition, the modules in the apparatus 20 and other foregoing operations and/or functions are separately used to implement a corresponding procedure of the data transmission method 200 in FIG. 4. In one embodiment, the sending module 21 is configured to perform operation 210, operation 230 and operation 250 in the method 200, the receiving module 22 is configured to perform operation 220 in the method 200, and the processing module 23 is configured to perform operation 240 in the method 200. A specific process of performing the corresponding operations by the modules is described in detail in the method 200. For brevity, details are not described herein again.

Alternatively, the apparatus 20 may include: a sending module 21 and a receiving module 22.

The receiving module 22 is configured to receive a third group of precoded reference signals and a fourth group of precoded reference signals, where the third group of precoded reference signals includes at least one precoded reference signal, and the fourth group of precoded reference signals includes at least one precoded reference signal.

The sending module 21 is configured to send at least one piece of third indication information based on a transmission scheme that CSI measurement is based on, where the at least one piece of third indication information is used to determine a plurality of precoding vectors, at least one of the plurality of precoding vectors corresponds to the at least one precoded reference signal in the third group of precoded reference signals, and at least one of the plurality of precoding vectors corresponds to the at least one precoded reference signal in the fourth group of precoded reference signals.

In one embodiment, the transmission scheme that the CSI measurement is based on includes: a space-time transmit diversity (STTD), a space-frequency transmit diversity (SFTD), a cyclic delay diversity (CDD) or polarization based precoder cycling. The CDD includes an SD-CDD and an LD-CDD.

It should be understood that, the transmission schemes described above are merely for illustration purposes, and should not constitute any limitation on this application. The transmission scheme that the CSI measurement is based on may further include: a diversity transmission, such as CDD based space division multiplexing, a precoder cycling based space-time transmit diversity, a precoder cycling based space-frequency transmit diversity, or a precoder cycling based CDD, and a combination of the foregoing transmission schemes.

In one embodiment, the sending module 21 is further configured to send fourth indication information, and the fourth indication information indicates a transmission scheme for uplink data transmission.

In one embodiment, the fourth indication information is set in the CSI reporting setting information.

In one embodiment, the third group of precoded reference signals corresponds to the first polarization direction, and the fourth group of precoded reference signals corresponds to the second polarization direction.

In one embodiment, the third indication information is a PMI, the terminal device pre-stores one-to-one correspondences between a plurality of PMIs and a plurality of matrices, and each matrix in the plurality of matrices is used to indicate at least one precoding vector.

In one embodiment, there is one PMI, the PMI indicates a third matrix in the plurality of matrices, each column vector in the third matrix is used to indicate two precoding vectors in the plurality of precoding vectors, one of the two precoding vectors corresponds to the at least one precoded reference signal in the third group of precoded reference signals, and the other one of the two precoding vectors corresponds to the at least one precoded reference signal in the fourth group of precoded reference signals.

In one embodiment, there are two PMIs, the two PMIs have a one-to-one correspondence with two fourth matrices in the plurality of matrices, each PMI indicates a fourth matrix, one of the two fourth matrices is used to indicate a third group of precoding vectors, the third group of precoding vectors corresponds to the at least one precoded reference signal in the third group of precoded reference signals, the other one of the two fourth matrices is used to indicate a fourth group of precoding vectors, the fourth group of precoding vectors corresponds to the at least one precoded reference signal in the fourth group of precoded reference signals, and the plurality of precoding vectors include the third group of precoding vectors and the fourth group of precoding vectors.

In one embodiment, the sending module 21 is further configured to send fifth indication information, where the fifth indication information is used to instruct the terminal device to send a plurality of groups of precoded reference signals.

It should be understood that the apparatus 20 may correspond to the network device in the data transmission method 300 according to the embodiments of this application, and the apparatus 20 may include modules configured to perform a method performed by the terminal device configured to perform the data transmission method 300 in FIG. 5. In addition, the modules in the apparatus 20 and other foregoing operations and/or functions are separately used to implement a corresponding procedure of the data transmission method 300 in FIG. 5. In one embodiment, the receiving module 22 is configured to perform operation 310 and operation 360 in the method 300, and the sending module 21 is configured to perform operation 320 to operation 340 in the method 300. A specific process of performing the corresponding operations by the modules is described in detail in the method 300. For brevity, details are not described herein again.

Figure 9:
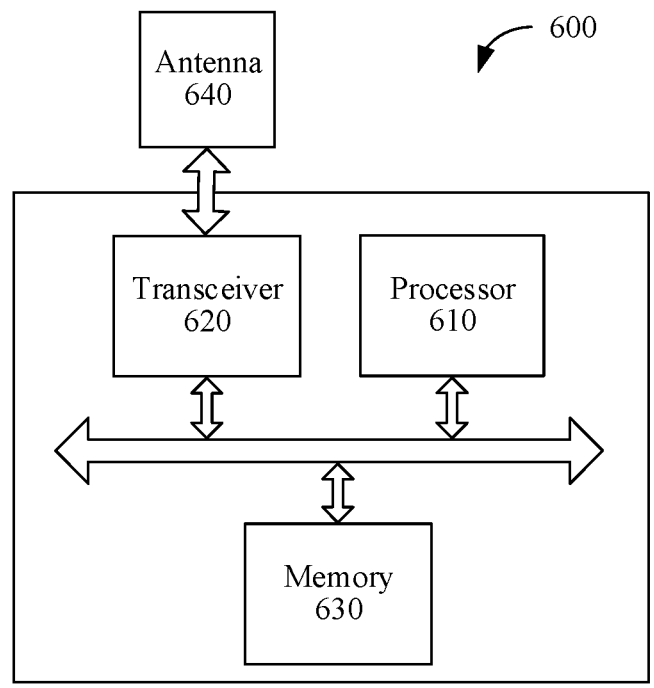
FIG. 9 is a schematic structural diagram of a network device according to an embodiment of this application.

FIG. 9 is a schematic structural diagram of a network device 600 according to an embodiment of this application. As shown in FIG. 9, the network device 600 includes a processor 610 and a transceiver 620. Optionally, the network device 600 further includes a memory 630. The processor 610, the transceiver 620 and the memory 630 communicate with each other by using internal connection channels, and transmit control and/or data signals. The memory 630 is configured to store a computer program, and the processor 610 is configured to: invoke and run the computer program from the memory 630 to control the transceiver 620 to receive and send a signal.

The foregoing processor 610 and the memory 630 may be integrated into one processing apparatus. The processor 610 is configured to execute program code stored in the memory 630, to implement the foregoing function. During specific implementation, the memory 630 may also be integrated in the processor 610, or independent of the processor 610.

The network device may further include an antenna 640, configured to send out, by using a radio signal, downlink data or downlink control signaling output by the transceiver 620.

In one embodiment, the network device 600 may correspond to the network device in the data transmission method 200 according to the embodiments of this application, and the network device 600 may include modules configured to perform a method performed by the network device configured to perform the data transmission method 200 in FIG. 4. In addition, the modules in the network device 600 and other foregoing operations and/or functions are separately used to implement a corresponding procedure of the data transmission method 200 in FIG. 4. Specifically, the memory 630 is configured to: store program code and enable the processor 610 to control, when executing the program code, the transceiver 620 to perform operation 210 to operation 230, and operation 250 in the method 200 by using an antenna 640, and perform operation 240 in the method 200. A specific process of performing the corresponding operations by the modules is described in detail in the method 200. For brevity, details are not described herein again.

Alternatively, the network device 600 may correspond to the network device in the data transmission method 300 according to the embodiments of this application, and the network device 600 may include modules configured to perform a method performed by the network device configured to perform the data transmission method 300 in FIG. 5. In addition, the modules in the network device 600 and other foregoing operations and/or functions are separately used to implement a corresponding procedure of the data transmission method 300 in FIG. 5. Specifically, the memory 630 is configured to: store program code and enable the processor 610 to control, when executing the program code, the transceiver 620 to perform operation 310 to operation 340, and operation 360 in the method 300 by using an antenna 640. A specific process of performing the corresponding operations by the modules is described in detail in the method 300. For brevity, details are not described herein again.

According to the method provided in the embodiments of this application, an embodiment of this application further provides a system, including the foregoing network device and one or more terminal devices.

It should be understood that, the processor in the embodiments of this application may be a central processing unit (CPU), or may further be another general purpose processor (GPU), a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should also be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of the RAM may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a terminal device, a first group of precoded reference signals and a second group of precoded reference signals, each of the first and second groups including at least one precoded reference signal, wherein the first group of precoded reference signals corresponds to a first polarization direction, and the second group of precoded reference signals corresponds to a second polarization direction; and
   feeding back, by the terminal device, at least one piece of first indication information based on a transmission scheme that a channel state information (CSI) feedback is based on, wherein the at least one piece of first indication information is used to determine a plurality of precoding vectors, at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

2. The method according to claim 1, further comprising:
   receiving, by the terminal device, second indication information, wherein the second indication information indicates the transmission scheme that the CSI feedback is based on.

3. The method according to claim 2, wherein the second indication information is set in CSI reporting setting information.

4. The method according to claim 1, wherein the first indication information includes a precoding matrix indicator (PMI), the terminal device pre-stores one-to-one correspondences between a plurality of PMIs and a plurality of matrices, and each matrix in the plurality of matrices is used to indicate at least one precoding vector.

5. The method according to claim 4, wherein the first indication information includes one PMI that indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals.

6. The method according to claim 4, wherein the first indication information includes two PMIs that have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors comprise the first group of precoding vectors and the second group of precoding vectors.

7. The method according to claim 1, wherein the transmission scheme that the CSI feedback is based on comprises: a space-time transmit diversity, a space-frequency transmit diversity, a cyclic delay diversity or polarization based precoder cycling.

8. A data transmission method, comprising:
   sending, by a network device, a first group of precoded reference signals and a second group of precoded reference signals, each of the first and second groups including at least one precoded reference signal, wherein the first group of precoded reference signals corresponds to a first polarization direction, and the second group of precoded reference signals corresponds to a second polarization direction;
   receiving, by the network device, at least one piece of first indication information; and
   determining, by the network device, a plurality of precoding vectors based on the at least one piece of first indication information, wherein the plurality of precoding vectors are related to a transmission scheme that a channel state information (CSI) feedback is based on, at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

9. The method according to claim 8, further comprising:
   sending, by the network device, second indication information, wherein the second indication information indicates the transmission scheme that the CSI feedback is based on.

10. The method according to claim 8, wherein the first indication information includes a precoding matrix indicator (PMI), the terminal device pre-stores one-to-one correspondences between a plurality of PMIs and a plurality of matrices, and each matrix in the plurality of matrices is used to indicate at least one precoding vector.

11. The method according to claim 10, wherein the first indication information includes one PMI that indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals; and the determining, by the network device, a plurality of precoding vectors based on the at least one piece of first indication information comprises:

determining, by the network device based on the first matrix indicated by the PMI, the two precoding vectors indicated by each column vector in the first matrix.

12. The method according to claim 10, wherein the first indication information includes two PMIs that have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors comprise the first group of precoding vectors and the second group of precoding vectors; and the determining, by the network device, a plurality of precoding vectors based on the at least one piece of first indication information comprises:

determining, by the network device, the first group of precoding vectors and the second group of precoding vectors based on the two second matrices indicated by the two PMIs.

13. A data transmission apparatus, comprising:

a receiver configured to receive a first group of precoded reference signals and a second group of precoded reference signals, each of the first and second groups including at least one precoded reference signal, wherein the first group of precoded reference signals corresponds to a first polarization direction, and the second group of precoded reference signals corresponds to a second polarization direction; and a transmitter configured to feed back at least one piece of first indication information based on a transmission scheme that a channel state information (CSI) feedback is based on, wherein the at least one piece of first indication information is used to determine a plurality of precoding vectors, at least one of the plurality of precoding vectors corresponds to the at least one precoded reference signal in the first group of precoded reference signals, and at least one of the plurality of precoding vectors corresponds to the at least one precoded reference signal in the second group of precoded reference signals.

14. The apparatus according to claim 13, wherein the receiver is further configured to receive second indication information, and the second indication information indicates the transmission scheme that the CSI feedback is based on.

15. The apparatus according to claim 13, wherein the first indication information includes a precoding matrix indicator (PMI), the terminal device pre-stores one-to-one correspondences between a plurality of PMIs and a plurality of matrices, and each matrix in the plurality of matrices is used to indicate at least one precoding vector.

16. The apparatus according to claim 15, wherein the first indication information includes one PMI, the PMI indicates a first matrix in the plurality of matrices, each column vector in the first matrix is used to indicate two precoding vectors in the plurality of precoding vectors, one of the two precoding vectors corresponds to the at least one precoded reference signal in the first group of precoded reference signals, and the other one of the two precoding vectors corresponds to the at least one precoded reference signal in the second group of precoded reference signals.

17. The apparatus according to claim 15, wherein the first indication information includes two PMIs, the two PMIs have a one-to-one correspondence with two second matrices in the plurality of matrices, each PMI indicates a second matrix, one of the two second matrices is used to indicate a first group of precoding vectors, the first group of precoding vectors corresponds to the at least one precoded reference signal in the first group of precoded reference signals, the other one of the two second matrices is used to indicate a second group of precoding vectors, the second group of precoding vectors corresponds to the at least one precoded reference signal in the second group of precoded reference signals, and the plurality of precoding vectors comprise the first group of precoding vectors and the second group of precoding vectors.

\* \* \* \* \*